United States Patent
Howard

(10) Patent No.: US 9,465,488 B2
(45) Date of Patent: Oct. 11, 2016

(54) SYSTEM AND METHOD FOR MOTION DETECTION AND INTERPRETATION

(71) Applicant: Stephen Howard, Dallas, TX (US)

(72) Inventor: Stephen Howard, Dallas, TX (US)

(*) Notice: Subject to any disclaimer, the term of this patent is extended or adjusted under 35 U.S.C. 154(b) by 0 days.

(21) Appl. No.: 14/535,823

(22) Filed: Nov. 7, 2014

(65) Prior Publication Data

US 2015/0062089 A1 Mar. 5, 2015

Related U.S. Application Data

(63) Continuation-in-part of application No. 13/890,709, filed on May 9, 2013.

(51) Int. Cl.
| | |
|---|---|
| *G06F 3/042* | (2006.01) |
| *G06F 1/16* | (2006.01) |
| *G06F 3/01* | (2006.01) |
| *H04N 5/225* | (2006.01) |
| *G06K 9/00* | (2006.01) |
| *G06K 9/20* | (2006.01) |

(52) U.S. Cl.
CPC ........... *G06F 3/0425* (2013.01); *G06F 1/1605* (2013.01); *G06F 3/01* (2013.01); *G06K 9/00288* (2013.01); *G06K 9/00355* (2013.01); *G06K 9/209* (2013.01); *H04N 5/2251* (2013.01)

(58) Field of Classification Search
CPC ...................................................... G06F 3/0425
USPC ......................................................... 345/419
See application file for complete search history.

(56) References Cited

U.S. PATENT DOCUMENTS

| | | | | |
|---|---|---|---|---|
| 5,933,132 A | * | 8/1999 | Marshall | H04N 9/3185 345/158 |
| 6,031,519 A | * | 2/2000 | O'Brien | G03H 1/0005 345/156 |
| 6,339,748 B1 | | 1/2002 | Hiramatsu | |
| 7,034,807 B2 | * | 4/2006 | Maggioni | G09F 27/00 345/156 |

(Continued)

FOREIGN PATENT DOCUMENTS

| | | |
|---|---|---|
| EP | 2210532 | 7/2010 |
| EP | 2397932 | 12/2011 |

*Primary Examiner* — Devona Faulk
*Assistant Examiner* — Hai Tao Sun

(57) ABSTRACT

A motion detection and interpretation system comprising a camera plus an infrared transmitter/receiver paired with a single reflective surface that records image data from two vantage points. The camera is connected to a computer and a display screen. The system creates a virtual touch screen for interaction with the display screen. The components of the system can be protected behind a transparent barrier while the virtual touch screen is provided for user interaction thus preventing user interference with, deterring vandalism and theft of, and prolonging the usable life of the equipment. In addition to finite hand movements detected by the virtual touch screen, the system can also simultaneously perform facial recognition and body movement recognition. The system is capable of interpreting multi-touch inputs. All recognitions are defined in the computer to carry out pre-programmed responses.

19 Claims, 22 Drawing Sheets

(56) References Cited

U.S. PATENT DOCUMENTS

| | | | |
|---|---|---|---|
| 7,084,857 B2 * | 8/2006 | Lieberman | G06F 3/011 345/158 |
| RE40,368 E | 6/2008 | Arnon | |
| 7,598,942 B2 | 10/2009 | Underkoffler et al. | |
| 8,094,129 B2 | 1/2012 | Izadi et al. | |
| 8,331,998 B2 | 12/2012 | Baratono et al. | |
| 2003/0120611 A1 * | 6/2003 | Yoshino | G06F 21/10 705/67 |
| 2006/0004280 A1 * | 1/2006 | Kotake | G06K 9/32 600/414 |
| 2008/0029691 A1 | 2/2008 | Han | |
| 2011/0242103 A1 * | 10/2011 | Han | H04N 13/0022 345/419 |
| 2012/0162077 A1 | 6/2012 | Sze et al. | |
| 2012/0212413 A1 | 8/2012 | Plagemann et al. | |
| 2012/0262366 A1 | 10/2012 | Zhu et al. | |
| 2012/0268372 A1 | 10/2012 | Park et al. | |
| 2012/0299879 A1 | 11/2012 | Kim | |
| 2012/0326958 A1 | 12/2012 | Deuel et al. | |
| 2013/0006814 A1 * | 1/2013 | Inoue | G06Q 30/0603 705/26.81 |
| 2013/0257748 A1 * | 10/2013 | Ambrus | G02B 27/0093 345/173 |

* cited by examiner

SYSTEM AND METHOD FOR MOTION DETECTION AND INTERPRETATION

CROSS REFERENCE TO RELATED APPLICATION

This application is a continuation in part of U.S. application Ser. No. 13/890,709 filed May 9, 2013. The above identified patent application is incorporated herein by reference in its entirety to provide continuity of disclosure.

FIELD OF THE INVENTION

This disclosure relates to the field of automated motion detection. More particularly this disclosure relates to computer vision systems registering body motion inputs and translating such inputs into computer instructions.

BACKGROUND OF THE INVENTION

Interactive motion detection and interpretation is useful in many modern computing applications such as gaming, retail, bank teller machines, and communications. In the prior art, a video camera, an infrared (IR) emitter/detector, a display screen and a computer processor are required to translate body motion inputs into computer instructions. In the prior art, a single camera only works sufficiently in applications that recognize broad movements, such as gaming, but not in applications that require inputs from small or discrete movements or that require an obstructed view of the user. In many applications, such as gaming, the display may block some portion of the camera's view of the user. In other applications, such as bank teller machines, physical security of the system often times requires an obstructed view of the user. To compensate for an obstructed view, the prior art requires additional cameras placed behind, above, or to the side of the display to provide an unobstructed view of the user. However, multiple cameras increase complexity and cost.

For example, U.S. Pat. No. 7,598,942 to Underkoffler, et al. discloses a gestural interface to visually presented elements on a display screen. Multiple cameras capture movement and detect location and orientation and generate output signals to processors connected to a computer. The processors translate the camera outputs into gestural signals which are interpreted as input information. The computer uses the input information to generate commands to control computer functions.

U.S. Pat. No. 7,034,807 to Maggioni discloses a system for interaction with a display. The system includes a recording unit for recording a pointer object in the vicinity of the display. A computer is connected to the recording unit and is used to determine a position of the pointer object. The system requires multiple cameras and multiple reflective surfaces.

U.S. Patent Application Publication No. 2012/0212413 to Plagemann, et al. discloses a system for receiving image information and translating it into computer instructions. Image information is received for a single predetermined action space to identify motion. A camera combined with mirrors, prisms, or optic cables is used to gather the image information. However, only one action area is monitored at any given time.

U.S. Patent Application Publication No. 2012/0162077 to Sze, et al. discloses an input device used to detect locations and motions of objects in a virtual working area. A camera is directed to a region of interest. A region of interest is illuminated by a "flat" beam of light. An object is placed in the region of interest and illuminated. The camera captures an image of the object and sends it to the processor. The processor processes the image to obtain locations and movements. Based on the movements, the processor produces computer instructions.

Therefore, there is a need for a system of motion detection which requires only a single camera to gather video data from an obstructed viewpoint and to create a virtual touch screen for interpreting fine motor movements and translating them into computer instructions. There is also a need to provide physical security for such a system to prevent vandalism and theft.

SUMMARY

In a preferred embodiment, a system for purchasing a set of products is disclosed. The system includes a network, a computer connected to the network, a third party connected to the network, a user device connected to the network, a feedback display connected to the computer, a camera connected to the computer, and a mirror adjacent to the camera. The computer is programmed to store and execute instructions that cause the system to perform a method. The method includes the steps of defining an action area adjacent to the camera, defining a set of sub-action areas for the action area, receiving a perceived position in the action area, calculating an actual position from the perceived position, determining a sub-action position from the actual position, executing a set of actions based on the sub-action position and a predetermined time, and receiving a set of purchase information in response to the set of actions.

In another embodiment, the system disclosed gathers video data and depth information from around an obstruction with a single camera. A single mirror is geometrically positioned in such a way as to provide the camera a reflected view around the obstruction. The system creates a virtual touch screen for interaction with the computer from behind a glass barrier which prevents any physical contact between the user and the system.

Unlike the prior art, it is not required that the single camera of the system disclosed have an unobstructed view of the user. A novel positioning of the camera and the mirror provides a view of body movements and image recognition and a view around the obstruction to capture fine motor movements of, for example, a user's hands interacting with a virtual touch screen. The system also provides a novel component positioning which allows the components of the system to be protected behind glass, while still being accessible to the user via the virtual touch screen.

The system can simultaneously react to fine motor inputs and perform facial recognition. For example, it is possible for the system to identify a user by his facial characteristics and query the user for a manually entered personal identification number (PIN) at the same time. Other examples of useful embodiments include adaptive advertising displays in store windows, automatic teller machines requiring secure financial transactions, and building entrance security.

The virtual touch screen is a predefined three dimensional set of coordinates in which movements and positions behind an obstruction are recognized. The action area can be comprised of a plurality of separately defined actions areas each corresponding to a different function. When an object is detected in the action area, it is recognized and interpreted as a set of specific computer instructions. In one embodiment, a signal is sent to a display screen that confirms the interpretations to the user as they are being made.

The present disclosure provides a system which embodies significantly more than an abstract idea including technical advancements in the field of data processing and a transformation of data which is directly related to real world objects and situations.

BRIEF DESCRIPTION OF DRAWINGS

Reference will now be made to the following drawings.

DETAILED DESCRIPTION

Figure 1:
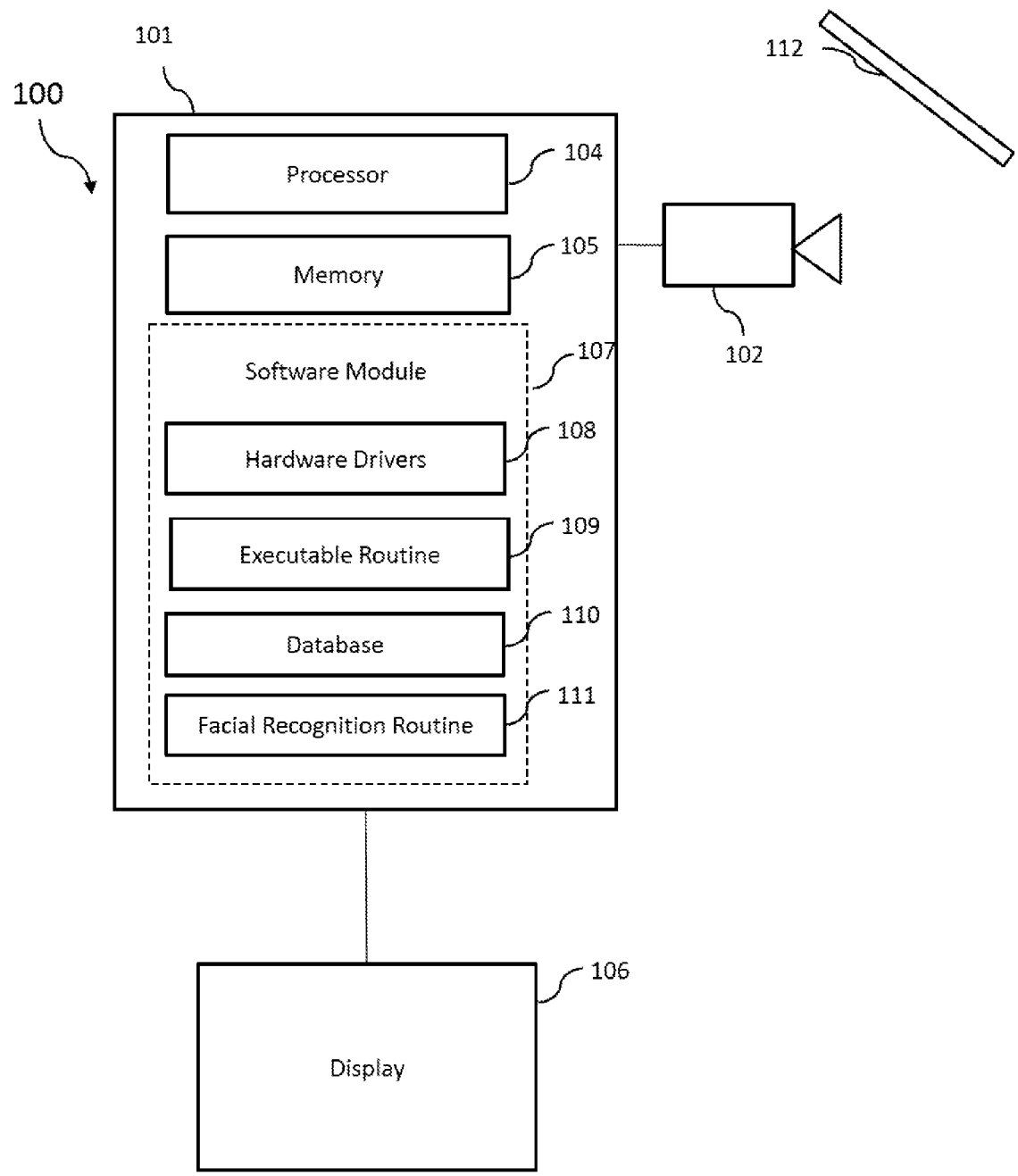
FIG. 1 is a schematic diagram of the components of a preferred embodiment.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware or combining software and hardware implementation that may all generally be referred to herein as a "circuit," "module," "component," or "system" (including firmware, resident software, micro-code, etc.). Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wire line, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described herein with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, components of motion detection and interpretation system 100 include computer 101 connected to camera 102. Camera 102 is known in the art and includes firmware for movement interpretation and image recognition. An example is the Carmine 1.08 3D sensor from PrimeSense of Tel-Aviv, Israel. Another example is the Xbox Kinect from Microsoft of Redmond, Wash. Camera 102 provides image data in the form of streaming video at the rate of 30 frames per second in a standard 640×480 VGA. The focal length of the camera is 525 pixels with a field of view of approximately 63°. The camera also provides distance-to-target information from an on-board infrared transmitter/receiver pair. The focal length of the infrared transmitter/receiver is 580 pixels with a field of view of approximately 58°. The infrared data is provided as a 16 bit number at a refresh rate of 200 μs.

Computer 101 contains processor 104, memory 105, and software module 107. Software module 107 includes hardware drivers 108. In a preferred embodiment, hardware drivers include an image capturing program such as Kinect for Windows available from Microsoft in Software Development Kit 1.7. Software module 107 includes executable routine 109 for coordination and execution of the system functions as will be further described. The software module includes a database 110. In a preferred embodiment, the database is a SQL database which resides in memory. The software module also includes facial recognition routine 111.

Computer 101 is connected to display 106. Display 106 in the preferred embodiment is a flat panel LCD screen provided by LG Electronics of South Korea. Mirror 112 is positioned within view of camera 102 as will be further described.

Figure 2A:
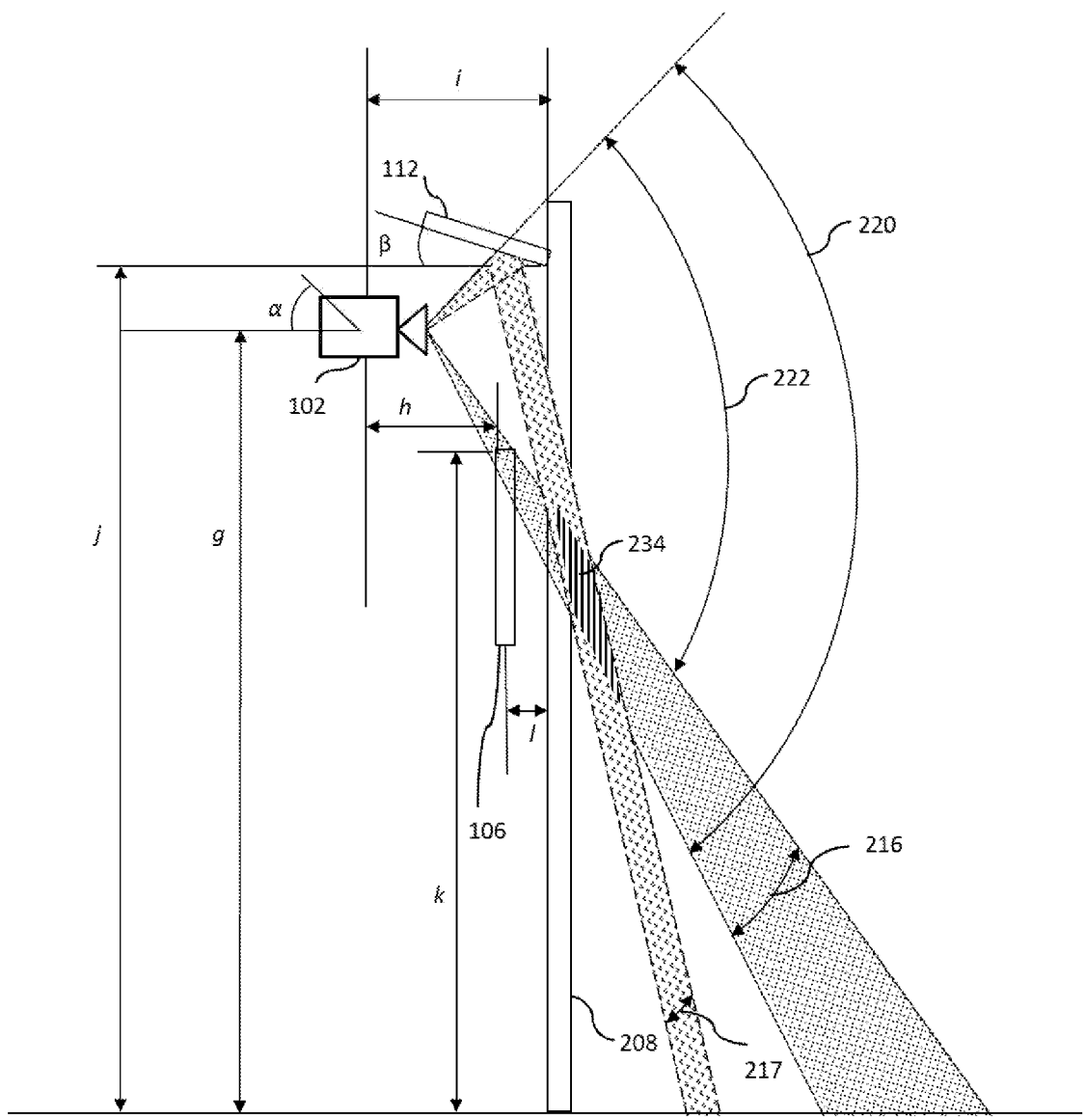
FIG. 2A is an elevation view of a preferred embodiment.

Referring to FIG. 2A, the relative positions of the views of camera 102 are shown. In general, camera 102 is positioned to achieve field of view 220. In the preferred embodiment, field of view 220 can range from 55°-110°. Glass 208 separates the user from camera 102 and display 106. Mirror 112 is positioned behind glass 208. In other preferred embodiments, when security is of lesser concern, mirror 112 can be positioned in front of glass 208. In a preferred embodiment, the mirror is a front silvered planar mirror having an optical coating to prevent distortion.

Display 106 is positioned a typical distance above the ground, usually about eye level. In order to be at eye level, the display necessarily blocks a portion of field of view 220, as shown by obstructed view 216. In an alternate preferred embodiment, field of view 220 may be narrow and/or the position of the camera relative to the display may be situated such that field of view 220 is not obstructed by the display. Partial field of view 222 represents the limited unobstructed view from camera 102. Reflected field of view 217 represents the portion of the total field returned by mirror 112. It is important to note that reflected field of view 217 allows the camera to compensate for the obstructed field of view 216 adjacent the display, thereby allowing actions that take place in the obstructed field of view to be recognized. Overlap area 234 represents the field of view visible to the camera that otherwise would be obstructed. It is also important to note that overlap area 234 is directly adjacent the display.

In a preferred embodiment, the camera is mounted a distance "g" from the floor and a distance "h" from the display. The visual axis of the camera is maintained at an angle α with respect to horizontal. The mirror is typically positioned a distance "i" from the camera and a distance "j" from the floor. The mirror is mounted at a fixed angle β from horizontal. The display is typically mounted at about eye level, at a distance "k" from the floor. The display is typically a distance "l" from the glass. The camera and mirror are shown positioned above the display; however, the camera and the mirror may also be positioned below or to the side of the display and still function as intended, so long as the relative positions of the devices provide for the overlap area. Table 1 summarizes the angles and distances as approximate ranges of the preferred embodiments:

TABLE 1

|   | Range | Preferred |
|---|---|---|
| g | 3.5-14 ft. | 7 ft. |
| h | 1 in.-8 ft. | 14 in. |
| i | 1 in.-2 ft. | 4 in. |
| j | 6-14 ft. | 7 ft. 1 in. |
| k | 3-9 ft. | 6 ft. |
| l | 1-6 in. | 2 in. |
| α | (−27)°-27° | −5° |
| β | 0°-110° | 45° |

Figure 2B:
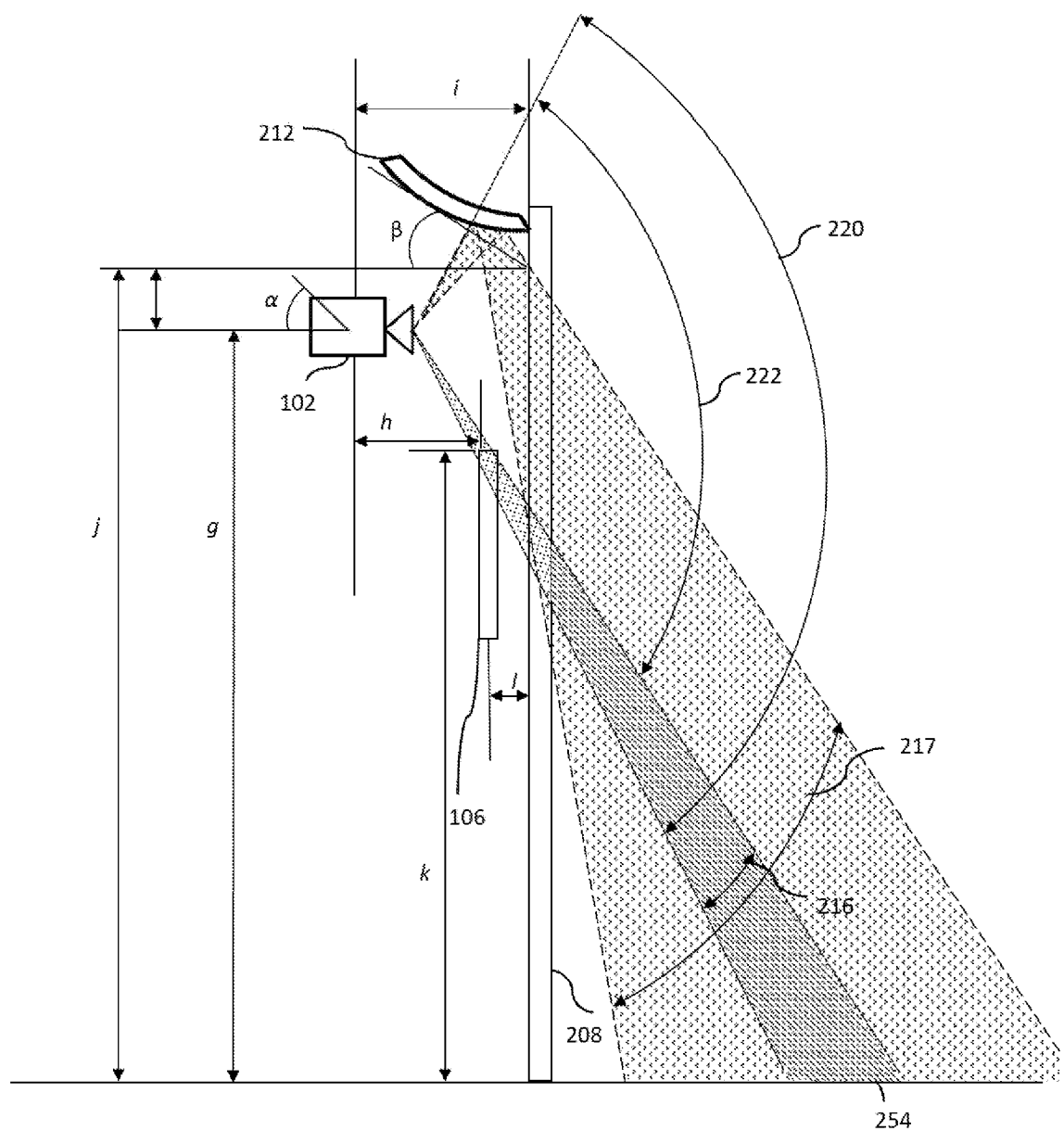
FIG. 2B is an elevation view of a preferred embodiment.
Figure 2C:
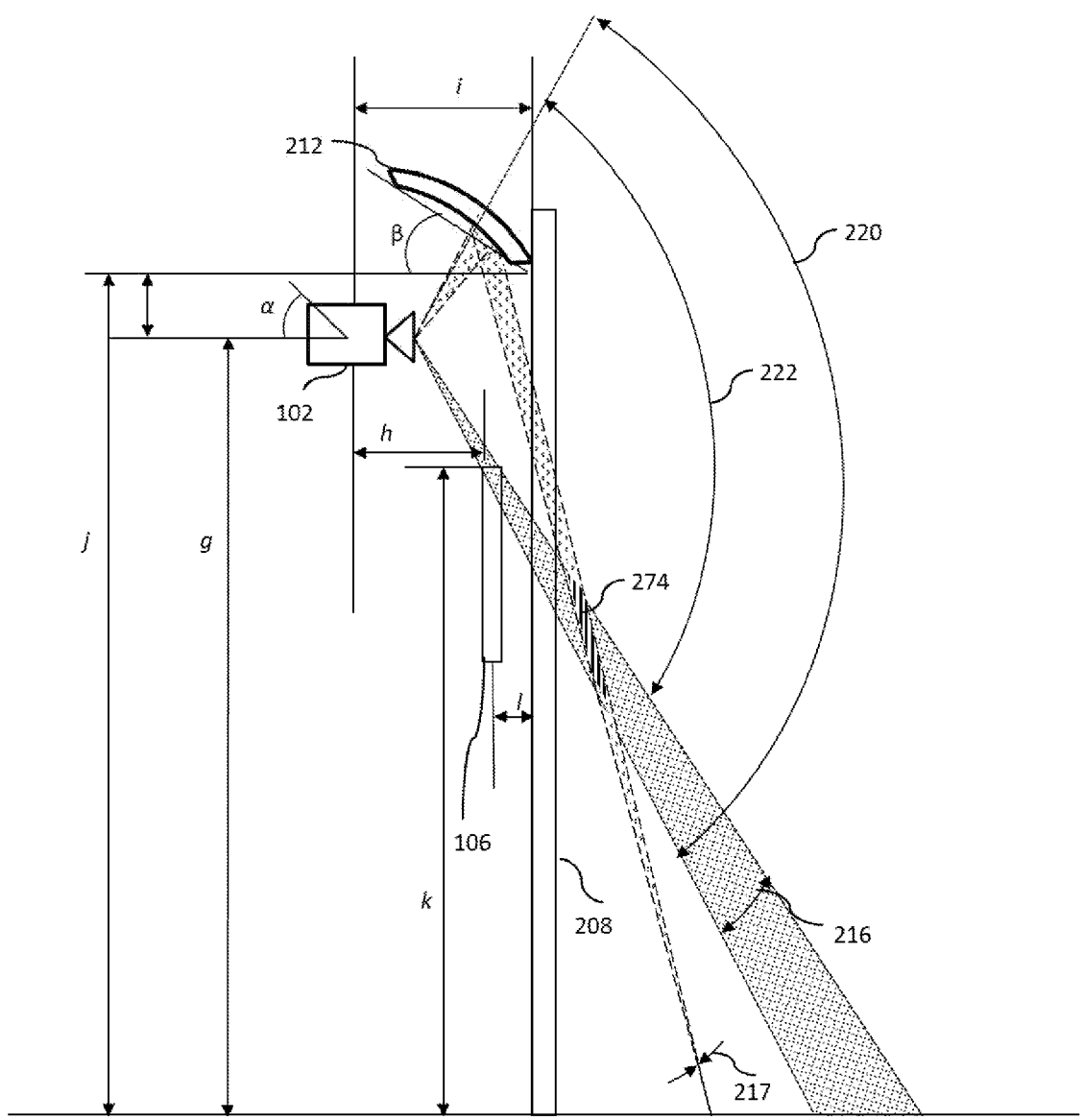
FIG. 2C is an elevation view of a preferred embodiment.

Referring to FIGS. 2B and 2C, other preferred embodiments are described. Curved mirror 212 is a curved mirror having a focal length f and a center curvature 2f. In a preferred embodiment, the curved mirror has a focal length of between about 1 and 4 inches. The curved mirror may be convex or concave. Further, the curved mirror may be curved in one or more planes, that is, it may spherical or cylindrical. The convex mirror in these embodiments is a front silvered mirror having an optical coating to reduce distortion. Curved mirror 212 provides the camera with a reflected field of view 217. Reflected field of view 217 results in overlap area 254. If the curved mirror is of a convex nature, overlap area 254 is significantly larger and overlap area 234. The larger overlap enables the system to track gross motor movements over a larger area. If the curved mirror is of a concave nature, overlap area 274 is significantly smaller, thus allowing the system to track fine motor movements more accurately than the prior art as will be further described.

Figure 3:
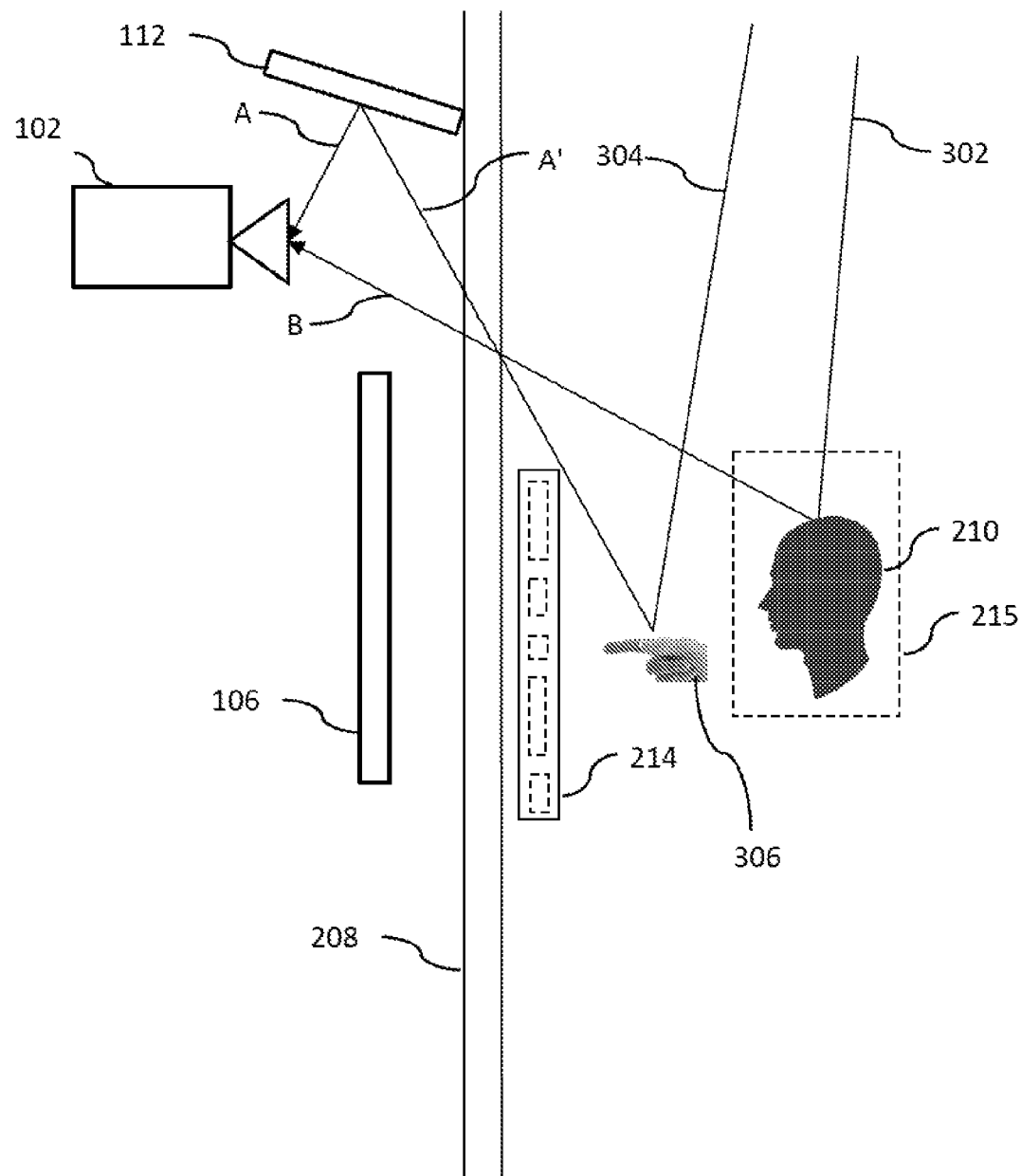
FIG. 3 is a ray diagram of a preferred embodiment.

Referring to FIG. 3, the relative positions of action area 214 and user 210 are described. Action area 214 is a 3-dimensional space defined by the software module. In general, the action area is positioned adjacent glass 208 and between user 210 and display 106. The action area is located in the overlap area, that is both in the reflected field of view and the obstructed field of view. A ray diagram shows incident light 302 reflected from user 210 into camera 102. Similarly, incident light 304 is reflected from hand 306 of user 210 to mirror 112 where it is further reflected to camera 102. Camera 102 reports distance "A+A'" as the distance to hand 306 and distance "B" as the distance from the facial image of user 210 to the computer, as will be further described.

Figure 4:
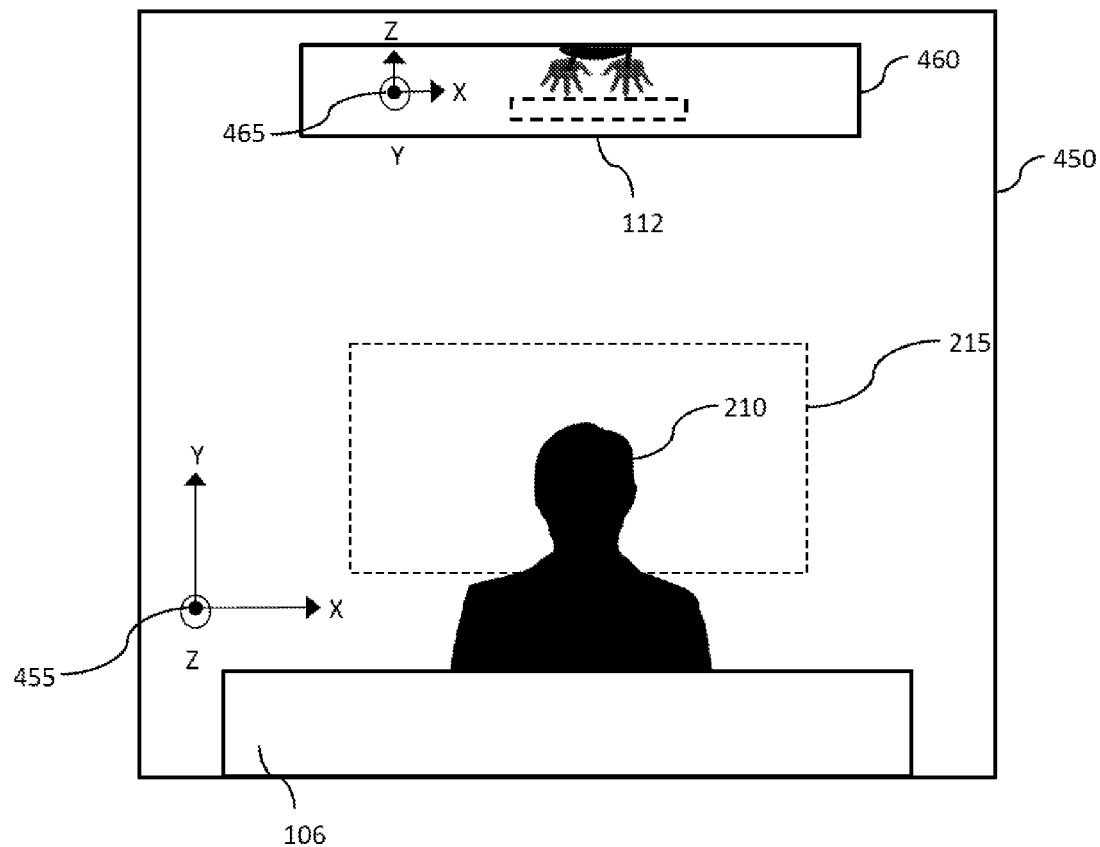
FIG. 4 is a schematic of a field of view of a camera of a preferred embodiment.

Referring to FIG. 4, the image data gathered by camera 102 includes image 450. Image 450 also includes reflected image 460. Reflected image 460 reflects light from mirror 112. In use, image 450 includes that portion of the user not blocked by display 106. In use, reflected image 460 includes both a view of the user's hands (which are obstructed from the view of the camera) and action area 214.

The reflected image alters the reference coordinates in the image data gathered by the camera. The camera receives data according to coordinate system reference 455 for the image 450. For example, the x axis represents horizontal. The y axis represents vertical and the z axis is out of the page. However, reflected image 460 is reported to the camera according to coordinate system 465. In coordinate system 465, the x axis is horizontal, the y axis is out of the page and the z axis is vertical. Hence, the y and z axes are reversed between coordinate systems 455 and 465. Action area 214, as will be further described later, is defined in reflected image 460. Facial recognition area 215, as will be described further later, is defined in image 450.

Figure 5:
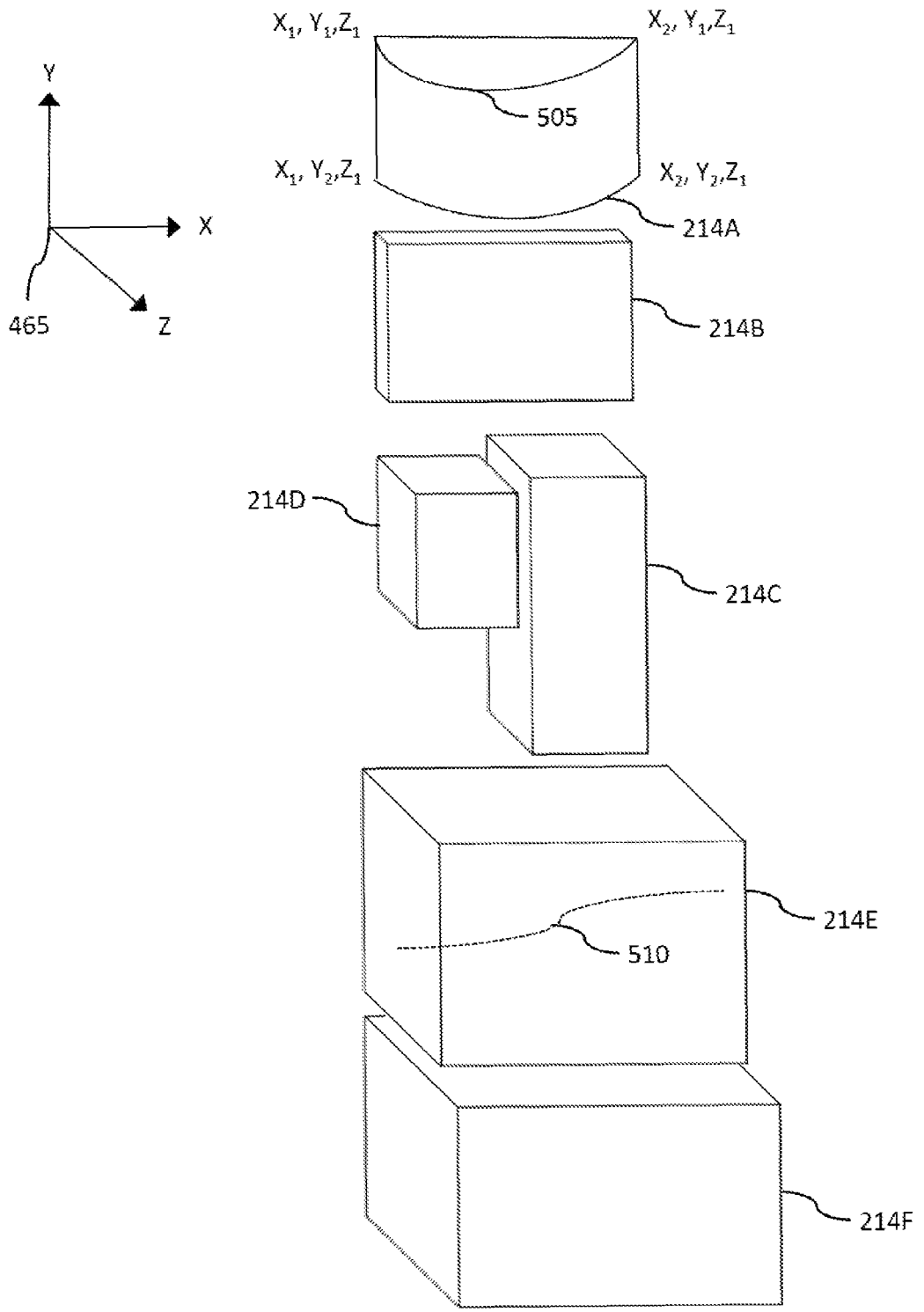
FIG. 5 is an isometric view of an action area of a preferred embodiment.

Referring to FIG. 5, action area 214 is described in more detail. Action area 214 is sub-divided into a series of three-dimensional geometric shapes within coordinate system 465. Each of the geometric shapes is bounded by a series of points which form lines enclosing certain discrete volumes. For example, sub-action area 214A is bounded by a set of points including $X_1, Y_1, Z_1; X_2, Y_1, Z_1; X_1, Y_2, Z_1;$ $X_2, Y_2, Z_1;$ and function 505. Function 505, in this example, is a hyperbolic function defined by the equation $$C \approx x^2 + y^2 \qquad \text{Eq. 1}$$

Of course, other hyperbolic functions or linear functions may be used to define any set of points, in the X, Y, or Z directions, defining a general shape, so long as the function is closed with respect to the discrete area.

As further shown in FIG. 5, the various "widths," "lengths" and "depths" for each sub-action item can vary. For example, sub-action area 214B comprises a relatively "shallow" depth. Such shallow depths are useful to directly "mimic" a prior art touch screen, thereby conveying to the user a sensation that touching the glass surface causes the interaction. Sub-action areas 214C and 214D comprise "medium" depth areas. The medium depth areas convey to the user a sense that a computer function can be activated without actually touching the glass surface. Sub-action areas 214E and 215F comprise relatively "deep" action areas. Deep action areas, such as are shown in 214E and 214F are useful to record 3-dimensional paths indicated by a user, such as path 510.

Figure 6:
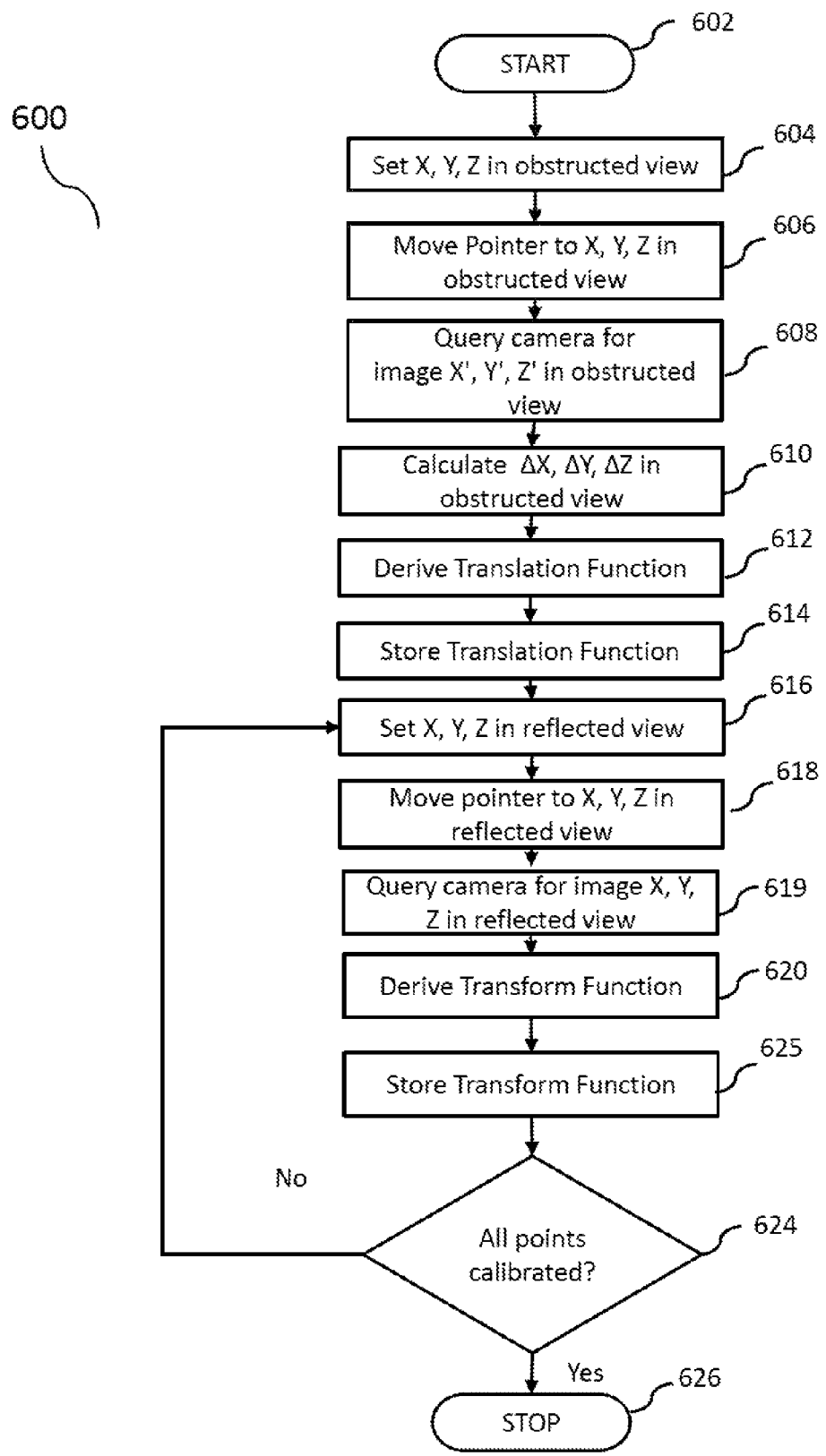
FIG. 6 is a flow chart of steps involved in the setup of a preferred embodiment.

Referring to FIG. 6, method 600 of calibrating the system is described. In order to correctly interpret images from the camera, it is necessary to calibrate actual locations within the action area to theoretical locations stored in memory. The following preferred method is used by the system to calibrate the boundaries of action area 214 and facial recognition area 215.

The method begins at step 602. At step 604, the processor is instructed to set an initial point X, Y, Z in the obstructed view to define a corner of the action area. At step 606, a pointer, such as a finger or stylus, is moved to the actual location X, Y, Z. At step 608, the processor queries the camera for the perceived image location X', Y', Z'. At step 610, the processor calculates the difference between the actual location X, Y, Z and the perceived location at X', Y', Z' to arrive at a difference ΔX, ΔY, ΔZ.

At step 612, ΔX, ΔY, and ΔZ are used to derive a translation function. In a preferred embodiment, the translation function is:

$$X = X' + \Delta X \qquad \text{Eq. 2}$$

$$Y = Y' + \Delta Y \qquad \text{Eq. 3}$$

$$Z = Z' + \Delta Z \qquad \text{Eq. 4}$$

At step 614, the translation function is stored. At step 616, the processor sets X, Y, Z in the reflected view. At step 618, the pointer is moved to the corresponding physical location in the reflected view. At step 619 the camera queried for the X, Y, Z location of the image. At step 620, a transform function is derived. Calibration of additional points is required if the transform function is nonlinear. Nonlinear transform functions may arise in embodiments where concave, convex or non-planar mirrors are used. If so, at step 624, the processor increments to the next point to be calibrated, and returns to step 616. If not, the processor moves to step 625 and stores the transform function. At step 626, the process is complete.

Figure 7:
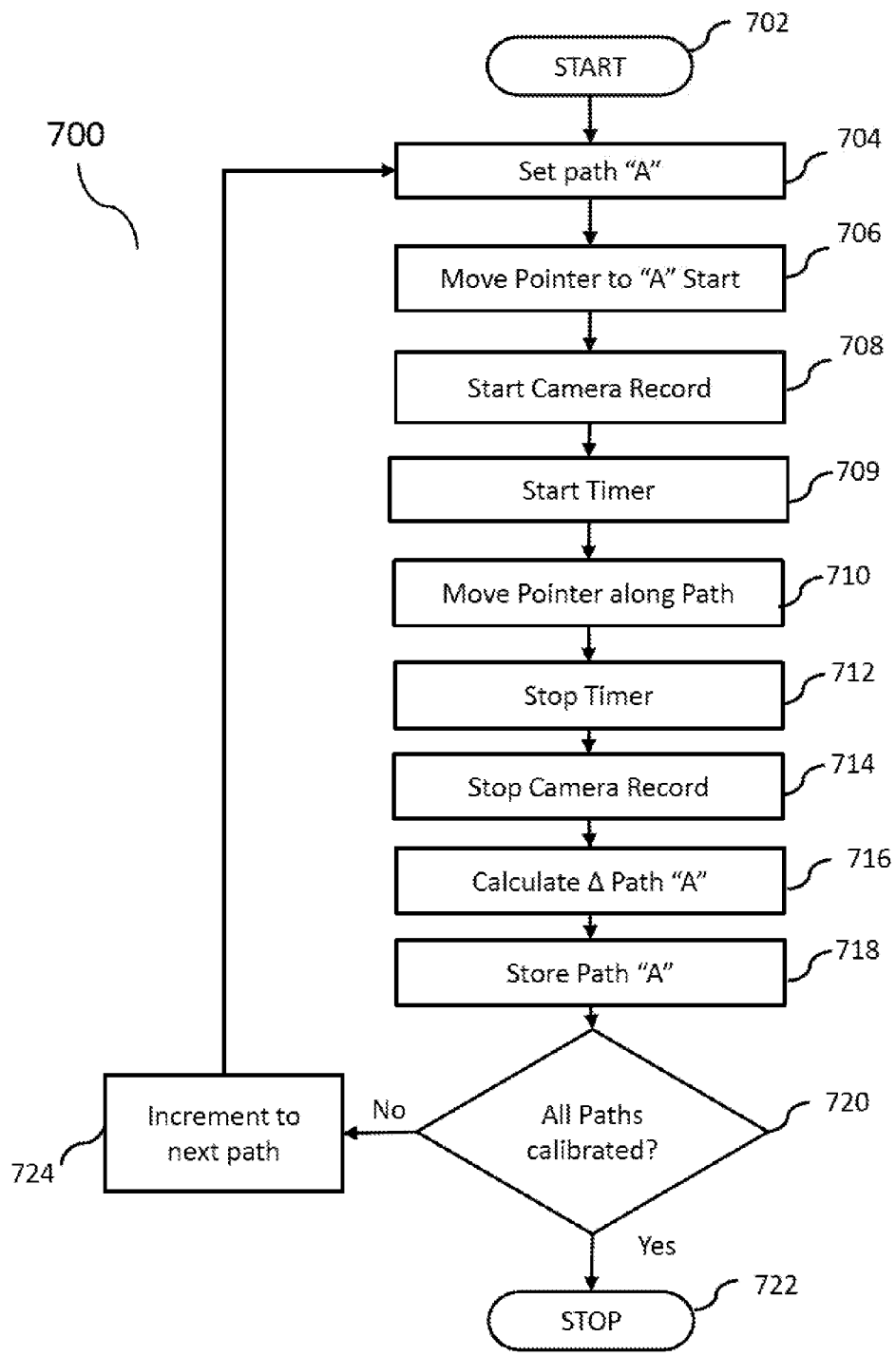
FIG. 7 is a flow chart of the steps involved in the use of a preferred embodiment.

Referring to FIG. 7, method 700 of calibrating a path is described. The method begins at step 702. At step 704, the chosen predefined path, such as path 510, is loaded into memory by the processor. At step 706, a pointer is moved to the start of the path. A step 708, the processor activates the camera and begins recording video data and storing it in memory. At step 709, the processor starts an internal timer to record the time it takes for the pointer to move along the path. At step 710, the pointer is moved through the path in action area 112 from the beginning of the path to the end of the path within a time "t". At step 712, upon the arrival of the pointer at the end of the path, the processor stops the timer.

At step 714, the processor then stops recording video images from the camera. At step 716, the processor calculates the equation of the path of "A" over the variables X, Y, Z and t, based on the recorded pointer movements. At step 716, the processor calculates the difference between the original path A and the stored path A'. At step 718, the new path A' is stored in memory. At step 720, the processor determines if all paths have been calibrated. If not, at step 724, the processor increments to the next path to be calibrated and returns to step 704. If all paths have been calibrated at step 720, the processor proceeds to step 722 and the process of path calibration is complete.

Figure 8:
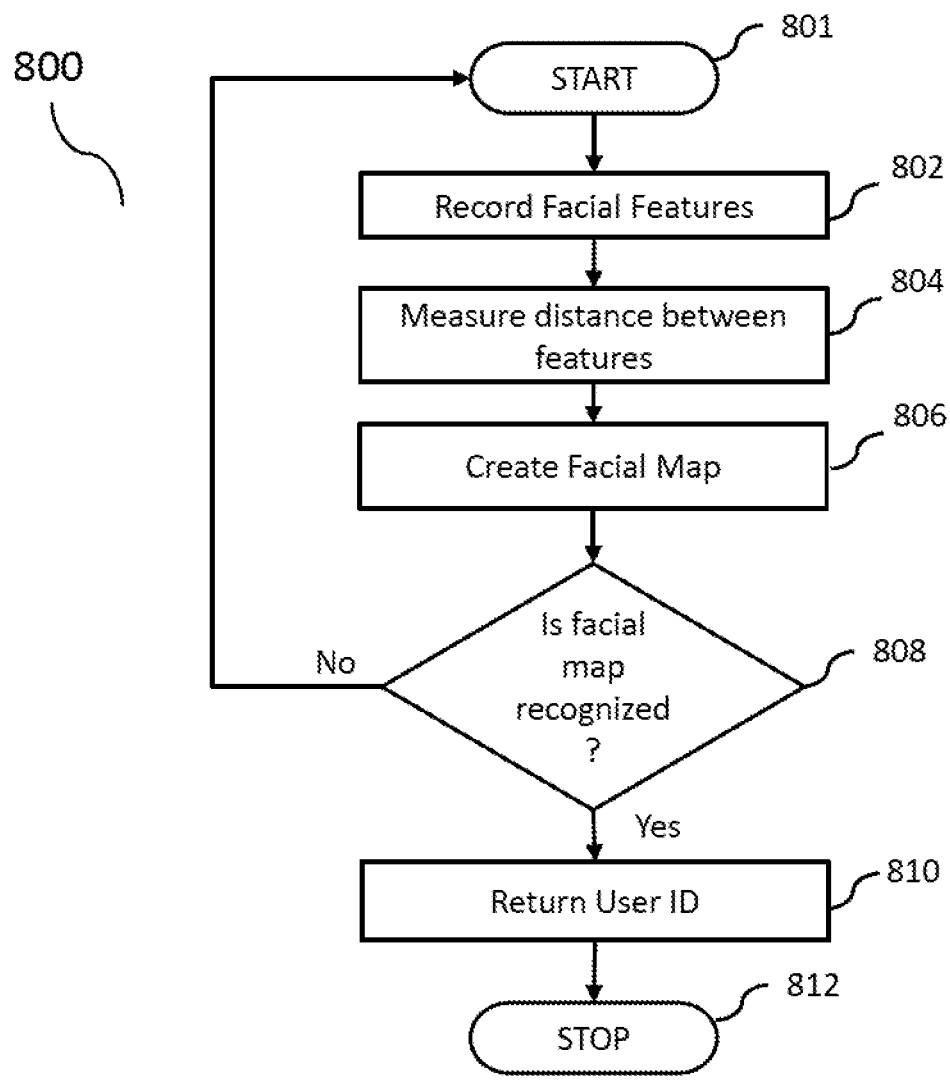
FIG. 8 is a flow chart of the steps involved in the facial recognition routine of a preferred embodiment.

Referring to FIG. 8, facial recognition routine 800 will be described. At step 801, the process starts. At step 802, the camera is queried for the locations of facial features including eye location and color, ear location, chin location and hair color. In a preferred embodiment, the query is accommodated by Microsoft SKD Rel. 7.1.LIB file Microsoft.Kinect.Toolkit.FaceTracking. In a preferred embodiment, at least 121 different locations are determined. At step 804, the distances between facial features are measured. A "facial map" is created at step 806. The facial map includes a table of the facial features and the distances between them. At step 808, the facial map is compared to a set of digital images stored in database 110. If the map is not recognized, then the process returns to step 801. If the facial map is recognized, then the process moves to step 810. At step 810, the user identification demographic is returned. At step 812, the process concludes.

Figure 9:
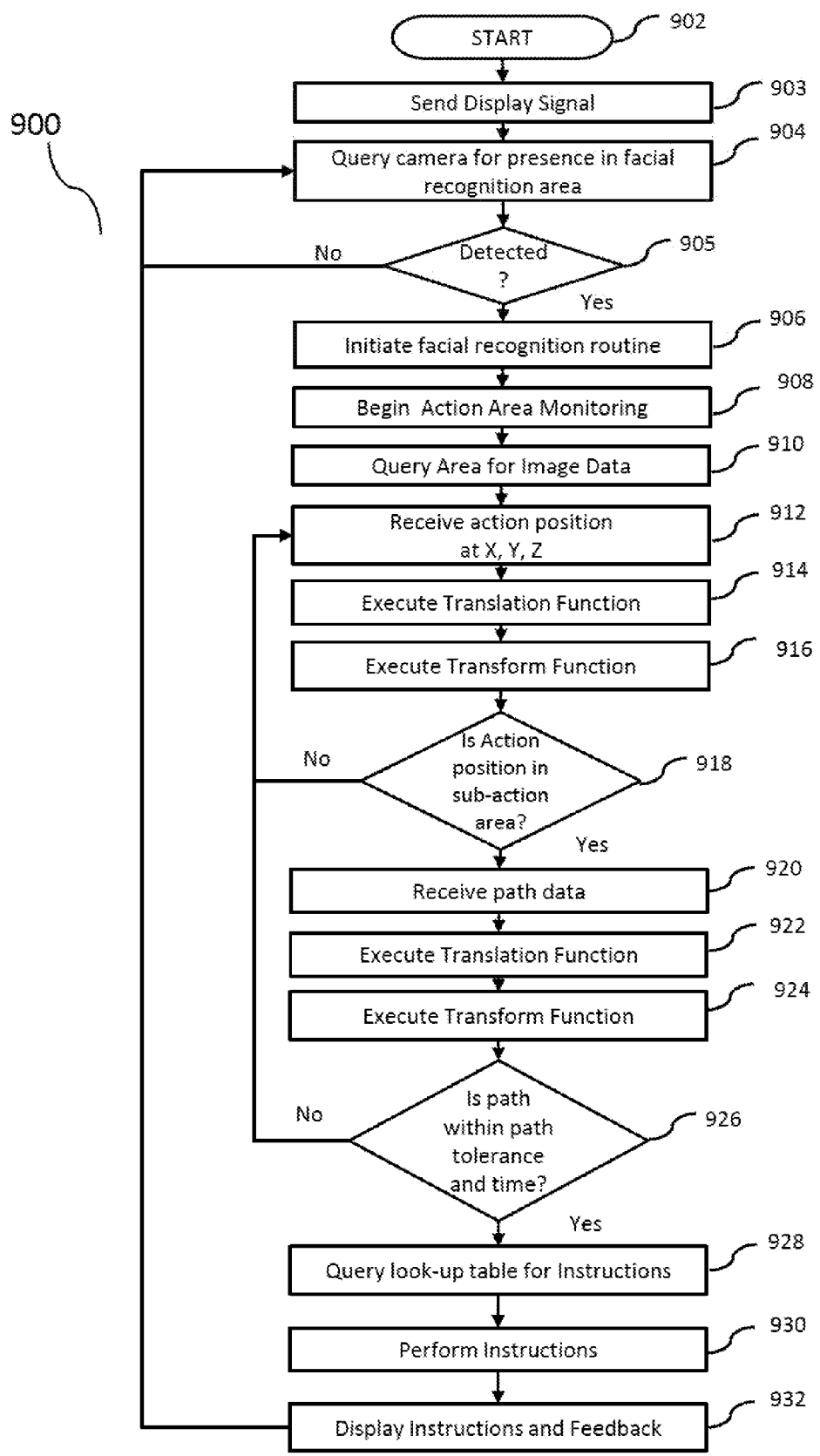
FIG. 9 is a flow chart of the steps involved for interaction with a virtual touch screen in a preferred embodiment.

Referring to FIG. 9, the steps involved in method 900 of use of motion detection system are described. At step 902, the processor is activated and loads the executable routine. A display signal is sent to the display at step 903 by the executable routine. In a preferred embodiment, the display signal includes a graphical and text picture which corresponds to a two-dimensional representation of the access area and sub-areas. At step 904, the camera is queried for motion presence in facial recognition area. At step 905, if no presence is detected, the processor returns to step 904. If a presence is detected, the process moves to step 906 and initiates the facial recognition routine to determine the identity of the user. In a preferred embodiment, the facial recognition routine sorts through the database to identify facial features which match a predetermined pattern. The database then is queried for associated user information, such as the user's name, and account status, which is stored in the memory for later use by the processor.

The processor then moves to step 908 where it begins monitoring the action area. At step 910, the camera is queried for image data within the action area.

At step 912, image data and distance data are perceived in the action area and returned from the camera as coordinates X, Y, Z. At step 914, the processor executes the translation function to translate the perceived coordinates into the actual coordinates. At step 916, the processor executes the transform function to interpret the coordinates of the reflected view into the coordinates of the unobstructed view so that "Y" and "Z" dimension information is accurately reported to the processor. At step 918, if the action position is no in a sub-action area then the process returns to step 912. If it is in a sub-action area, then the processor proceeds to step 920. At step 920, the processor receives path data from the action area including a set of path variables X, Y, Z over a defined time period, Δt. At step 922, the processor executes the translation function to translate the perceived path to the actual path. At step 924, the processor, executes the transform function to change the coordinates of the reflected view into the coordinates of the unobstructed view so that the path information is accurately reported to the processor. At step 926, the processor determines if a path defined by the action position corresponds to a path within a predefined tolerance and predefined time period. If the path is not within a predefined tolerance and a predefined time period, the processor returns to step 912. If the path is within a predetermined tolerance and a predefined time period, the processor proceeds to step 928. At step 928, a look-up table is queried for a predetermined instruction, if an action is within an action area and/or a motion is within a predefined path tolerance and time period. At step 930, the processor performs the instruction according to the look-up table. At step 932, the processor displays the results of and feedback from the instruction. After the instruction is displayed, the processor returns to step 904 and again queries the camera for the presence of a subject in the facial recognition area.

Figure 10:
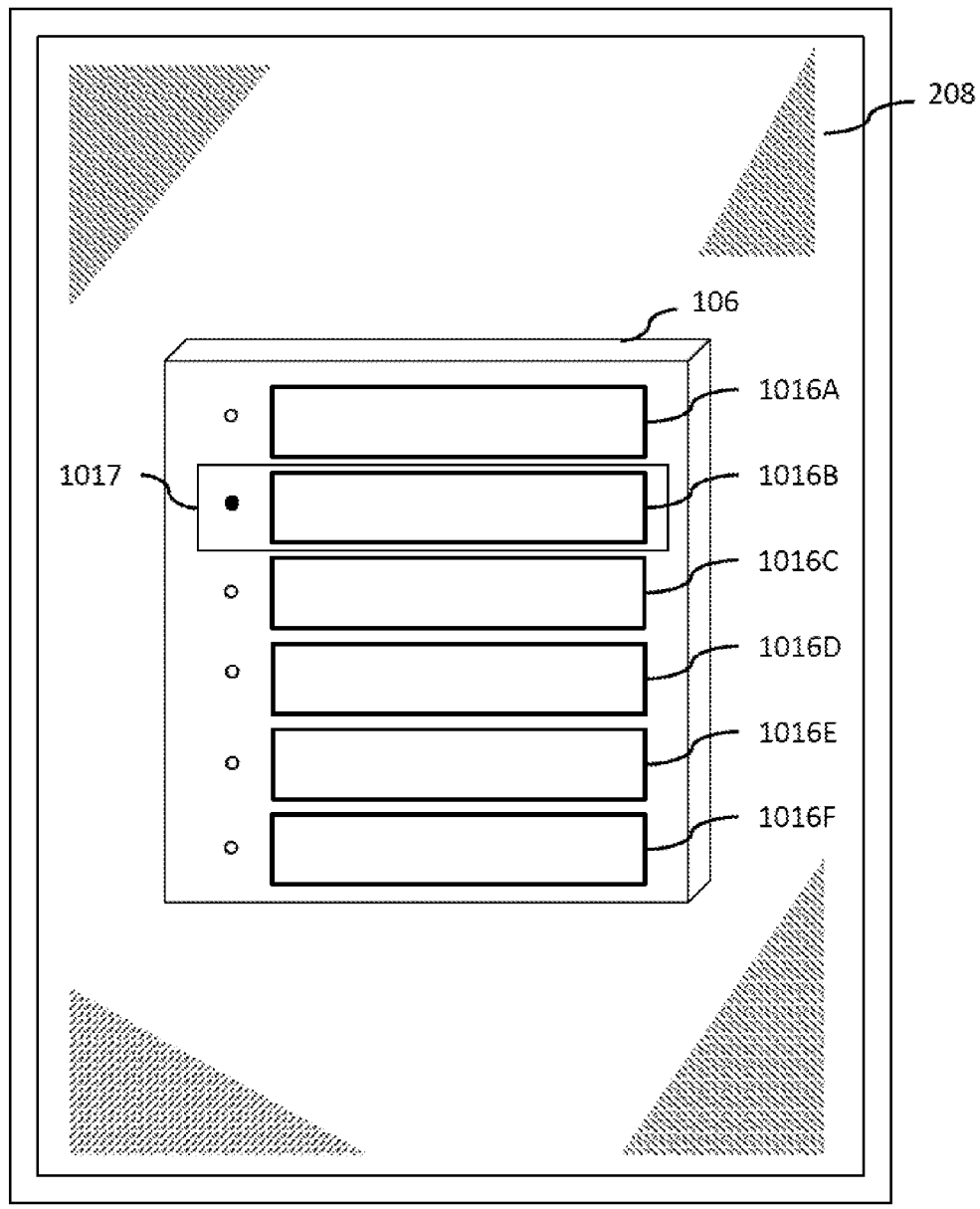
FIG. 10 is an elevation view of a display screen of a preferred embodiment.

FIG. 10 shows display 106 as viewed by a user outside glass 208. Selections 1016A-F are shown on display 106. A user can see the selections available on the display but cannot physically touch the display because it is behind glass 208. Feedback display 1017 provides visual confirmation of the system interface to the user. Confirming, that is, that actions have been recognized and correctly interpreted by the system. For example, an interaction with sub-action area 214B results in selection 1016B shown to the user to be selected as a radio button.

Figure 11:
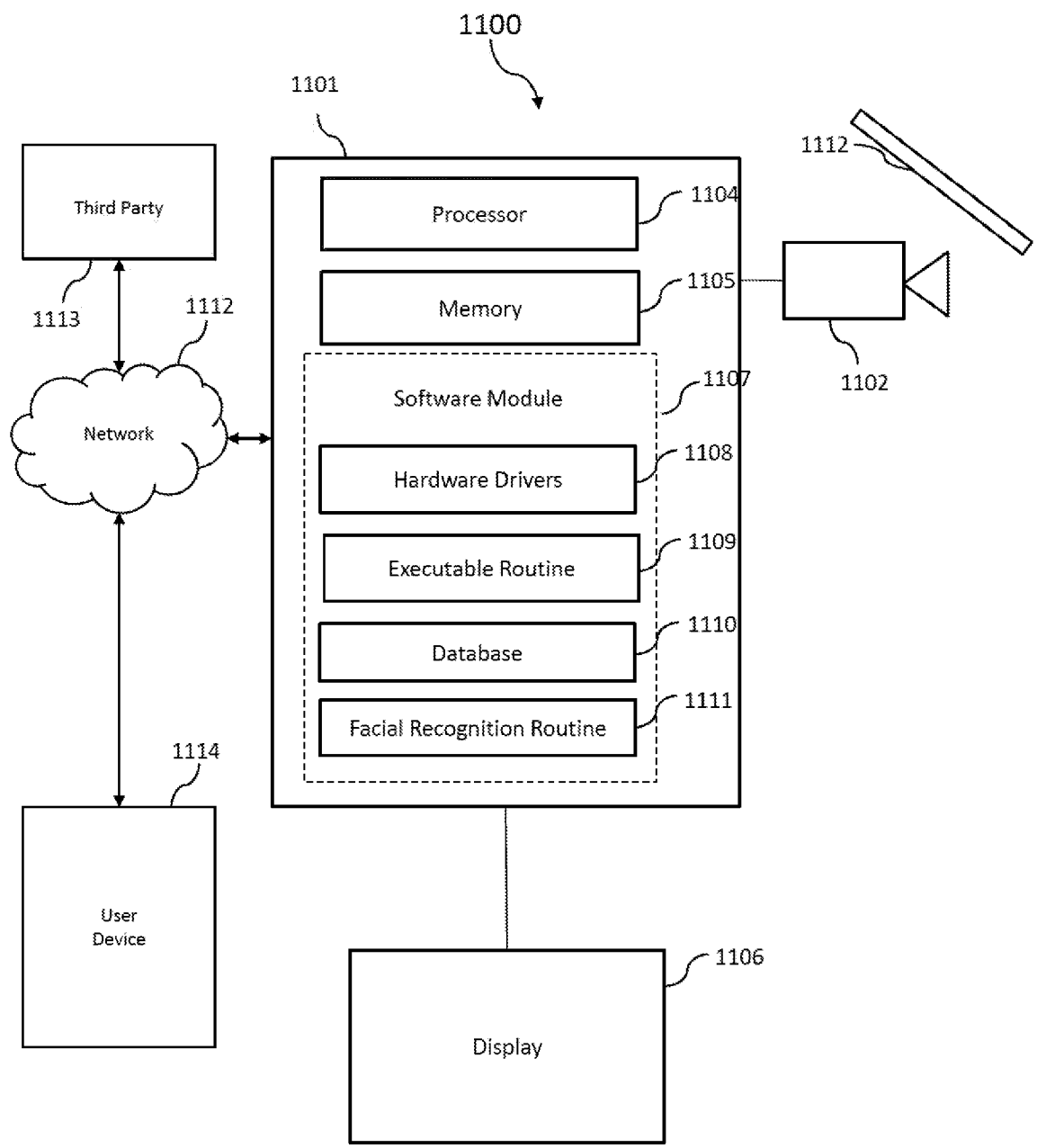
FIG. 11 is a schematic diagram of the components of a preferred embodiment.

Referring to FIG. 11 in another embodiment, system 1100 includes computer 1101 connected to camera 1102 and to network 1112. Third party 1113 and user device 1114 are connected to network 1112. Display 1106 is connected to computer 1101. Mirror 1112 is positioned adjacent to and in view of camera 1102, as will be further described below.

Computer 1101 includes processor 1104, memory 1105 connected to processor 1104, and software module 1107. Software module 1107 includes hardware drivers 1108, executable routine 1109, database 1110, and facial recognition routine 1111. Executable routine 109 for coordinates and executes system functions, as will be further described.

In a preferred embodiment, third party 1113 is a financial entity, such as a bank, a credit card company, a credit union, a payment processor such as PayPal, or a payment system such as Bitcoin. Any financial entity and/or payment system known in the art may be employed.

In a preferred embodiment, network 1112 is the Internet. In another embodiment, network 1112 is a local area network and a wide area network.

In one embodiment, user device 1114 is a smartphone. In another embodiment, user device 1114 is a tablet computer. Any computing device known in the art may be employed.

In a preferred embodiment, database 1110 is a SQL database which resides in memory 1105. Any database known in the art may be employed.

In a preferred embodiment, display 1106 in the preferred embodiment is a flat panel LCD screen provided by LG Electronics of South Korea. Any type of display known in the art may be employed.

In a preferred embodiment, hardware drivers 1108 include an image capturing program such as Kinect for Windows available from Microsoft in Software Development Kit 1.7.

Camera 1102 is known in the art and includes firmware for movement interpretation and image recognition. An example is the Carmine 1.08 3D sensor from PrimeSense of Tel-Aviv, Israel. Another example is the Xbox Kinect from Microsoft of Redmond, Wash. Camera 1102 provides image data in the form of streaming video at the rate of 30 frames per second in a standard 640×480 VGA. The focal length of the camera is 525 pixels with a field of view of approximately 63°. The camera also provides distance-to-target information from an on-board infrared transmitter/receiver pair. The focal length of the infrared transmitter/receiver is 580 pixels with a field of view of approximately 58°. The infrared data is provided as a 16 bit number at a refresh rate of 200 µs.

Figure 12:
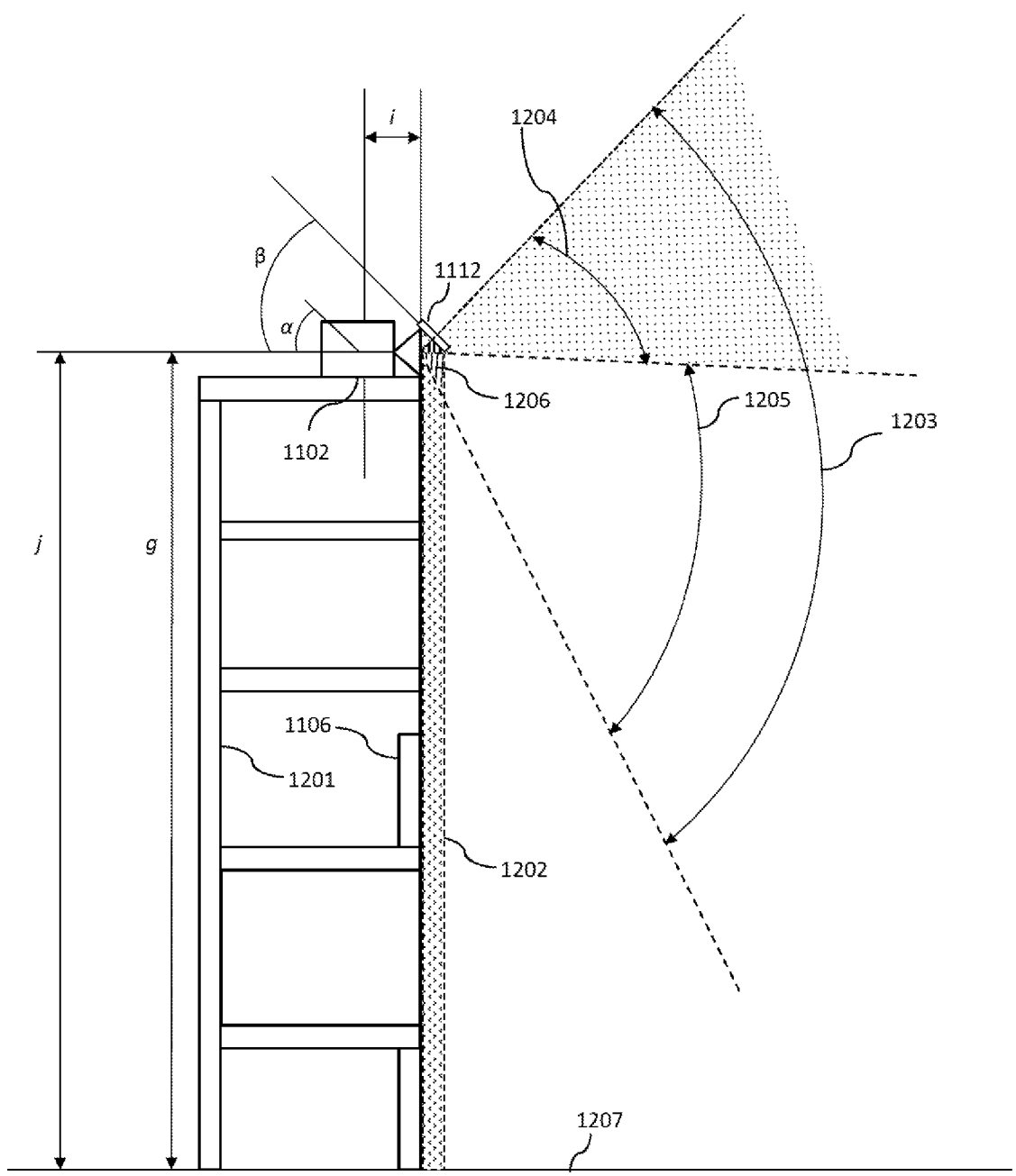
FIG. 12 is an elevation view of a preferred embodiment.
Figure 13:
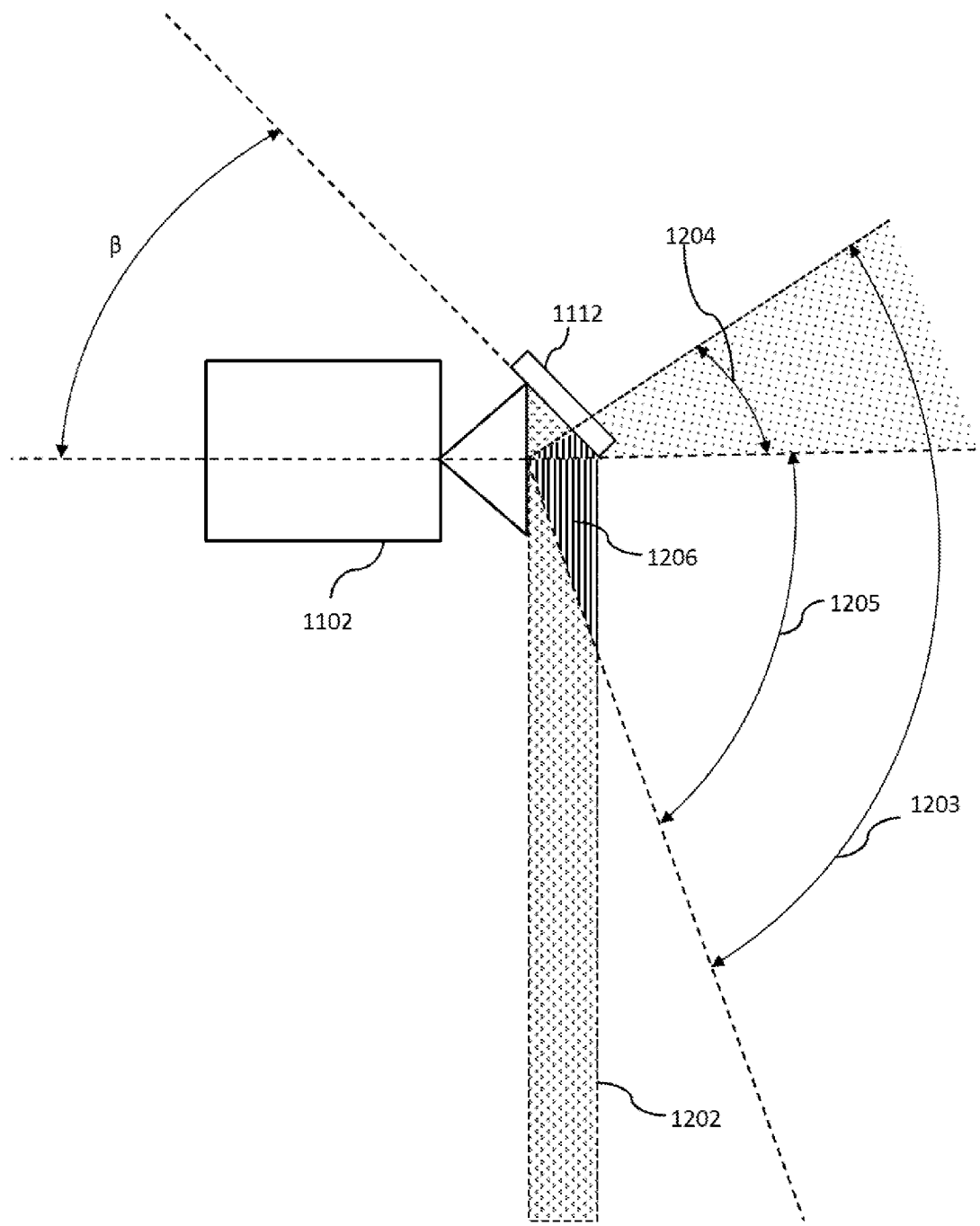
FIG. 13 is a detail elevation view of a preferred embodiment.

Referring to FIGS. 12 and 13, the relative positions of the views of camera 1102 are shown. Camera 1102 is positioned to achieve field of view 1203 adjacent to product shelf 1201. Mirror 1112 is positioned adjacent to camera 1102.

Partial field of view 1205 represents the limited unobstructed view from camera 1102. Reflected field of view 1202 represents the portion of the total field returned by mirror 1112. Overlap area 1206 represents the field of view visible to the camera from field of view 1203 and reflected field of view 1202.

In the preferred embodiment, field of view 1203 can range from 55°-110°. In a preferred embodiment, the mirror is a front silvered planar mirror having an optical coating to prevent distortion.

In a preferred embodiment, camera 1102 is mounted a distance "g" from the floor. Camera 1102 is positioned with respect to product shelf 1201 such that no portion of product shelf 1201 interferes with reflected field of view 1202. The visual axis of camera 1102 is maintained at an angle α with respect to horizontal. Mirror 1112 is typically positioned a distance "f" from camera 1102 and a distance "j" from floor 1207. Mirror 1207 is mounted at a fixed angle β from horizontal. Table 2 summarizes the angles and distances as approximate ranges of the preferred embodiments:

TABLE 2

|   | Range | Preferred |
|---|---|---|
| g | 3.5-14 ft. | 7 ft. |
| i | 1 in.-2 ft. | 4 in. |
| j | 6-14 ft. | 7 ft. 1 in. |
| α | (−27)°-27° | −5° |
| β | 0°-110° | 45° |

Figure 14:
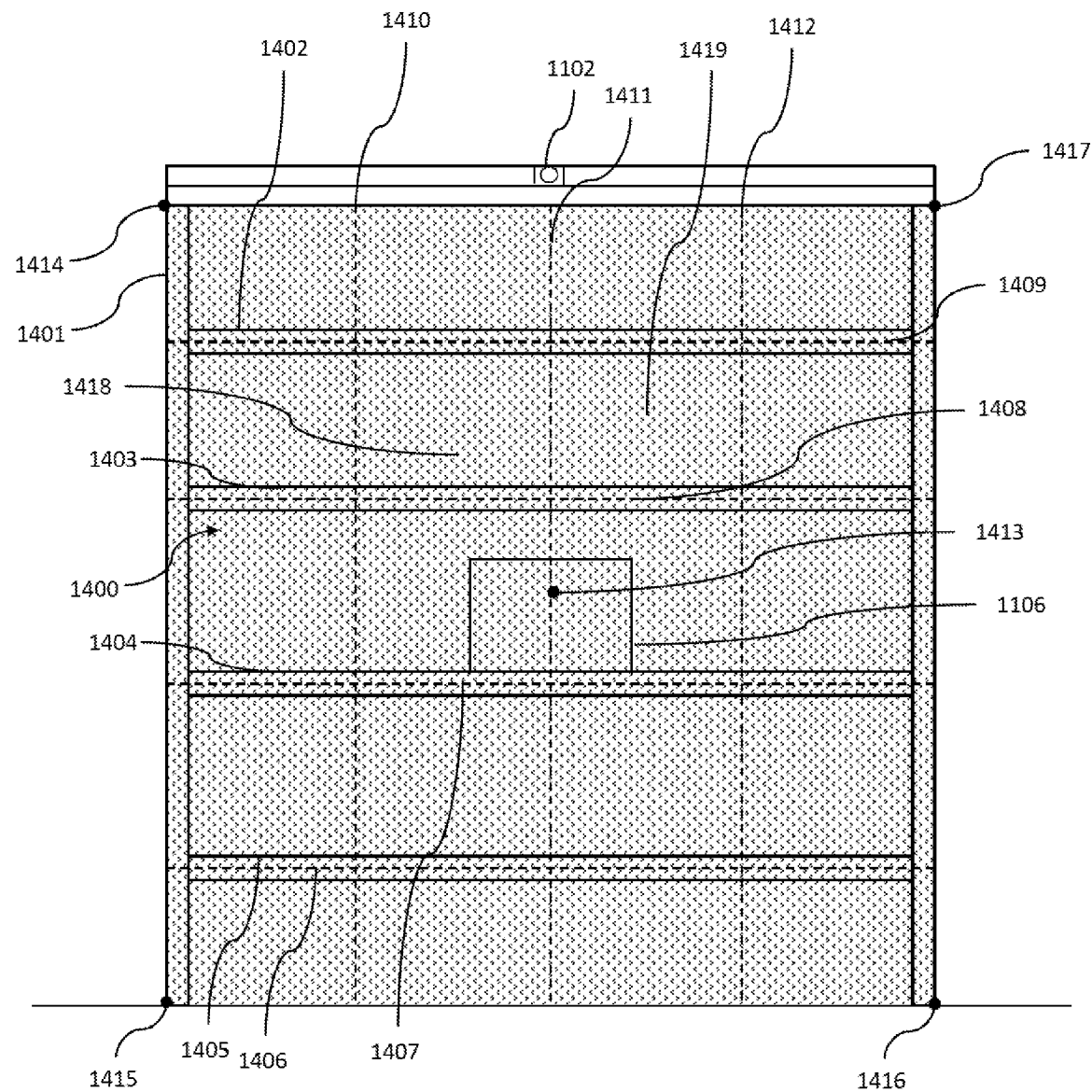
FIG. 14 is a field of view of a camera of preferred embodiment.

Referring to FIG. 14, product shelf 1401 includes shelves 1402, 1403, 1404, and 1405. Camera 1102 is mounted to product shelf 1401. Action area 1400 includes center point 1413 and is defined by corner points 1414, 1415, 1416, and 1417. Action area 1400 includes a set of sub-action areas defined by lines 1406, 1407, 1408, 1409, 1410, 1411, and 1412. For example, sub-action area 1418 is a rectangle defined by lines 1408, 1409, 1410, and 1411 and sub-action area 1419 is a rectangle adjacent to sub-action area 1418 and is defined by lines 1408, 1409, 1411, and 1412.

In a preferred embodiment, lines 1406, 1407, 1408, 1409, 1410, 1411, and 1412 are predetermined distances from center 1413.

In a preferred embodiment, action area 1400 is a two-dimensional plane defined by corner points 1414, 1415, 1416, and 1417, as will be further described below. In a preferred embodiment, action area 1400 is a rectangle or quadrilateral. In other embodiments, action area 1400 is any polygon. In this embodiment, display 1106 provides feedback information. In this embodiment, a user defines action area 1400 by moving a pointer, such as a finger or stylus, from center 1413 to a corner until the pointer is no longer in view of camera 1102. Once the pointer is no longer in the field of view of camera 1102, display 1106 displays a red signal, telling the user to stop moving the pointer. The process is repeated until all corners are defined.

In a preferred embodiment, each sub-action area corresponds to a different product displayed on product shelf 1401. For example, sub-action area 1418 corresponds to a book and sub-action area 1419 corresponds to a Blu-ray movie. In this example, the information corresponding to the book, including the sub-action area location, title, author, page numbers, publisher, and price are stored in the database of the system. The information for the Blu-ray movie, including the sub-action area location, title, credits, and price are stored in the database of the system. Any product or combination of products may be employed.

In a preferred embodiment, the system detects the presence of a user using the facial recognition routine, as previously described, and a user's hand in any of the sub-action areas. Based on the length of time a user's hand is present in a sub-action area, the system executes a predetermined action, as will be further described below.

Figure 15:
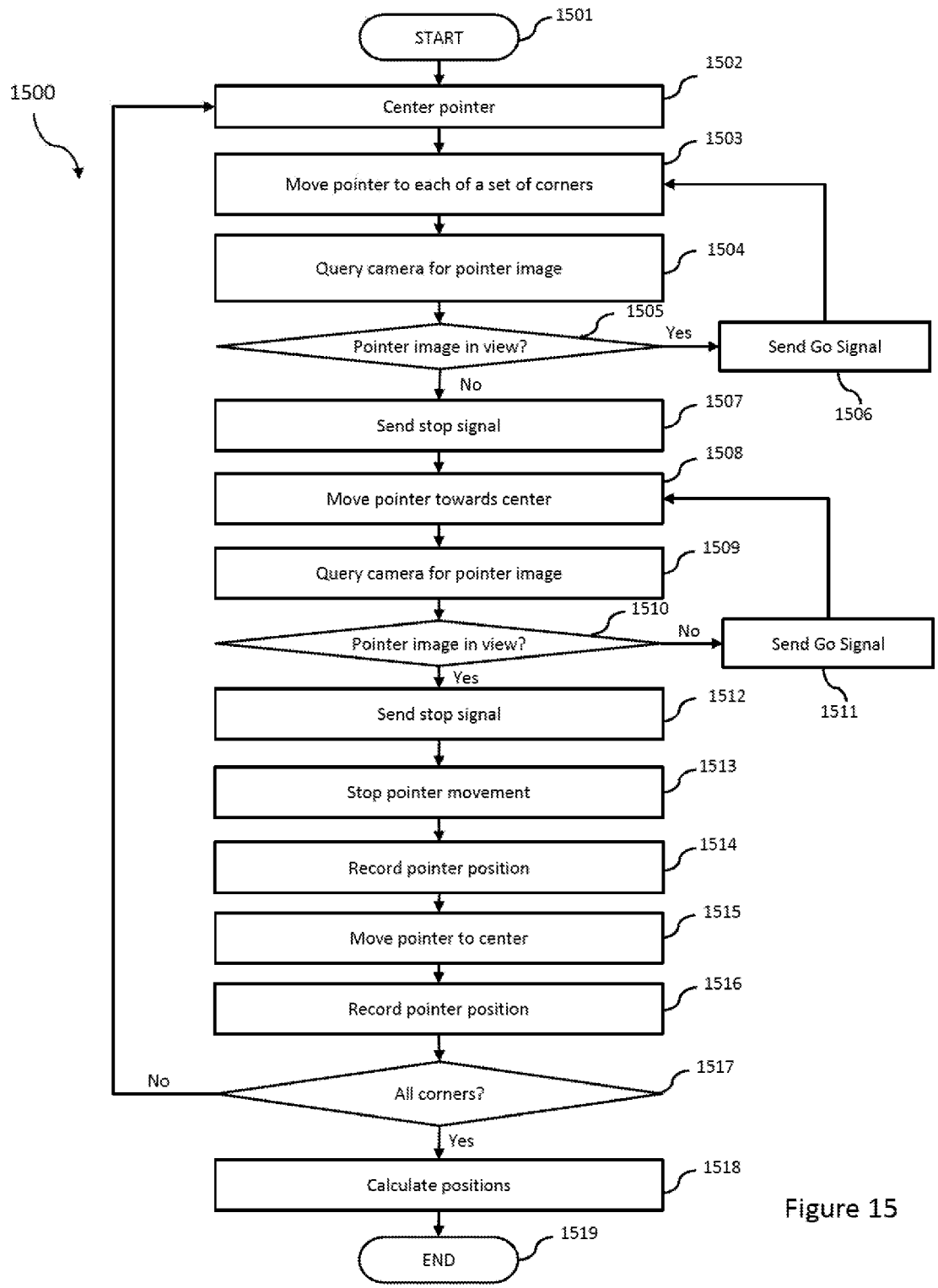
FIG. 15 is a flow chart of a method for calibrating the system of a preferred embodiment.

Referring to FIG. 15, method 1500 for defining and calibrating an action area for the system is described. The process starts at step 1501. At step 1502, a pointer is centered and the center point X, Y is set. At step 1503, the pointer is moved to a corner of a set of corners that will define the action area. At step 1504, the system queries the camera for the perceived pointer location. At step 1505, the system determines whether the image of the pointer is in view of the camera. If the pointer is in view of the camera, then a "go" signal is sent to the display at step 1506. In one embodiment, the "go" signal is a green light signal. In another embodiment, the "go" signal is a text display. Any type of signal may be employed. If the pointer is in view of the camera, then method 1500 proceeds to step 1507.

At step 1507, a "stop" signal is sent to the display. In one embodiment, the "stop" signal is a red light display. In another embodiment, the "stop" signal is a text display. Any type of signal may be employed.

At step 1508, the pointer is moved towards the center in response to the "stop" signal. At step 1509, the camera is queried for the perceived pointer image location. At step 1510, the system determines whether the image of the pointer is in view of the camera. If the pointer is not in view of the camera, then a "go" signal is sent to the display at step 1511. If the pointer is in view of the camera, then a "stop" signal is sent to the display at step 1512. At step 1513, the movement of the pointer is stopped at the corner location.

At step 1514, the system records the X, Y position of the pointer at the corner. At step 1515, the pointer is moved back to the center. At step 1516, the position of the pointer is recorded. At step 1517, a determination is made as to whether all corners of the set of corners for the action area have been recorded. If not, then method 1500 returns to step 1502. If so, method 1500 proceeds to step 1518. At step 1518, the recorded positions of the set of corners and the center position are calculated and saved, as will be further described below. At step 1519, method 1500 ends. Method 1500 is repeated to defined and calibrate each of the set of sub-action areas.

Figure 16:
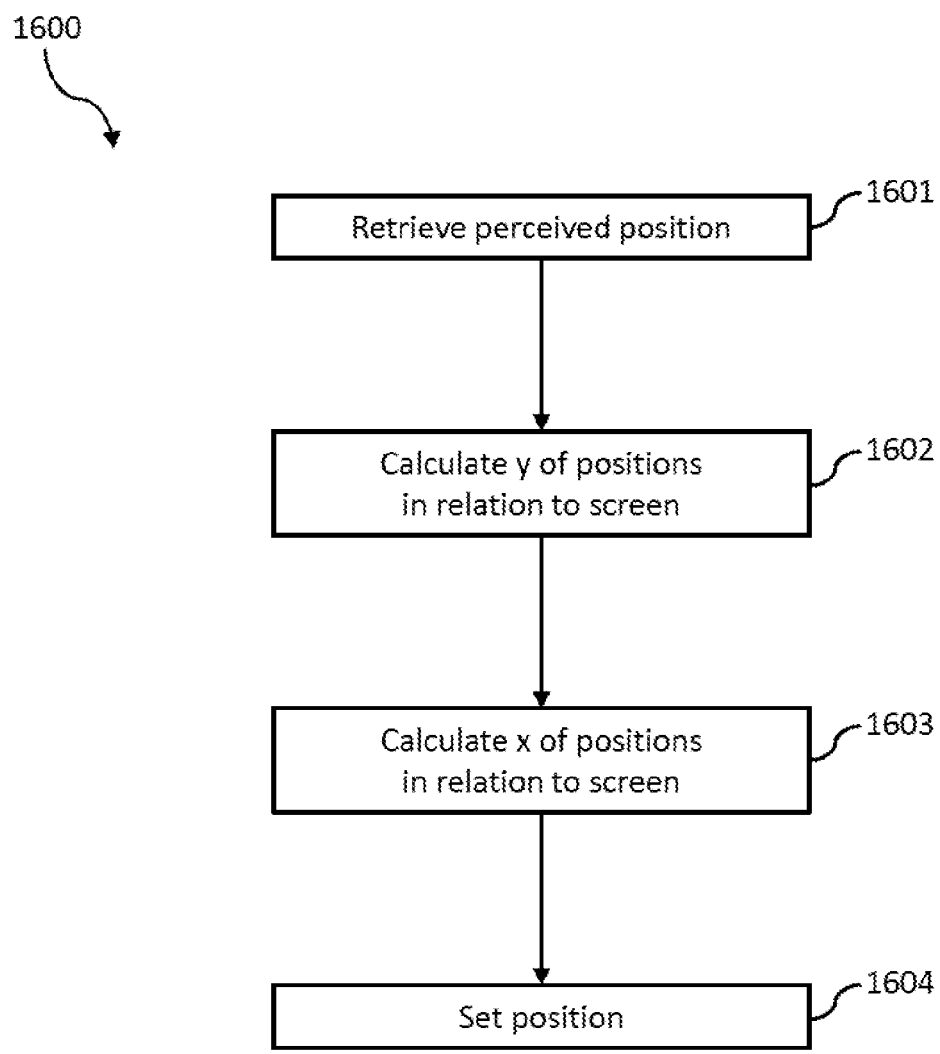
FIG. 16 is a flow chart of a method for converting a set of positions of a preferred embodiment.

Referring to FIG. 16, step 1518 will be further described as method 1600. In method 1600, the perceived camera points are translated to a screen to transform each action/or sub-action area into a quadrilateral, or other polygon, that fits into the pixel dimensions of a computer screen. In this way, each point of the action and/or sub-action area becomes "selectable" in the same manner as a point on the computer screen.

At step 1601, the camera-perceived action position $x_c$, $y_c$ is retrieved. At step 1602, the y coordinate of the actual position, $y_s$, is calculated in relation to a screen using the position $x_c$, $y_c$ by $$y_s = x_c \cdot l_{s_2} + y_c \cdot l_{s_4} + 1 \cdot l_{s_6} \qquad \text{Eq. 5}$$

where $l_{s_2}$, $l_{s_4}$, $l_{s_6}$ are defined by a least squares matrix, $$M_{ls} = \begin{bmatrix} l_{s_1} & l_{s_2} \\ l_{s_3} & l_{s_4} \\ l_{s_5} & l_{s_6} \end{bmatrix}. \qquad \text{Eq. 6}$$

The least squares matrix, $M_{ls}$, will be further defined below.

At step 1603, the x coordinate of the actual position, $x_s$ is calculated in relation to the screen using position $x_c$, $y_c$ by $$x_s = m_1 \cdot x_c + m_2 \cdot y_c + m_3, \qquad \text{Eq. 7}$$

where $m_1$, $m_2$, and $m_3$ are defined by a multiplied matrix, $M_m$ $$M_m = \begin{bmatrix} m_1 & m_2 & m_3 \\ m_4 & m_5 & m_6 \\ m_7 & m_8 & m_9 \end{bmatrix}. \qquad \text{Eq. 8}$$

The multiplied matrix, $M_m$, will be further defined below.

At step 1604, the actual position of X, Y is set as the actual position and saved in memory.

Figure 17:
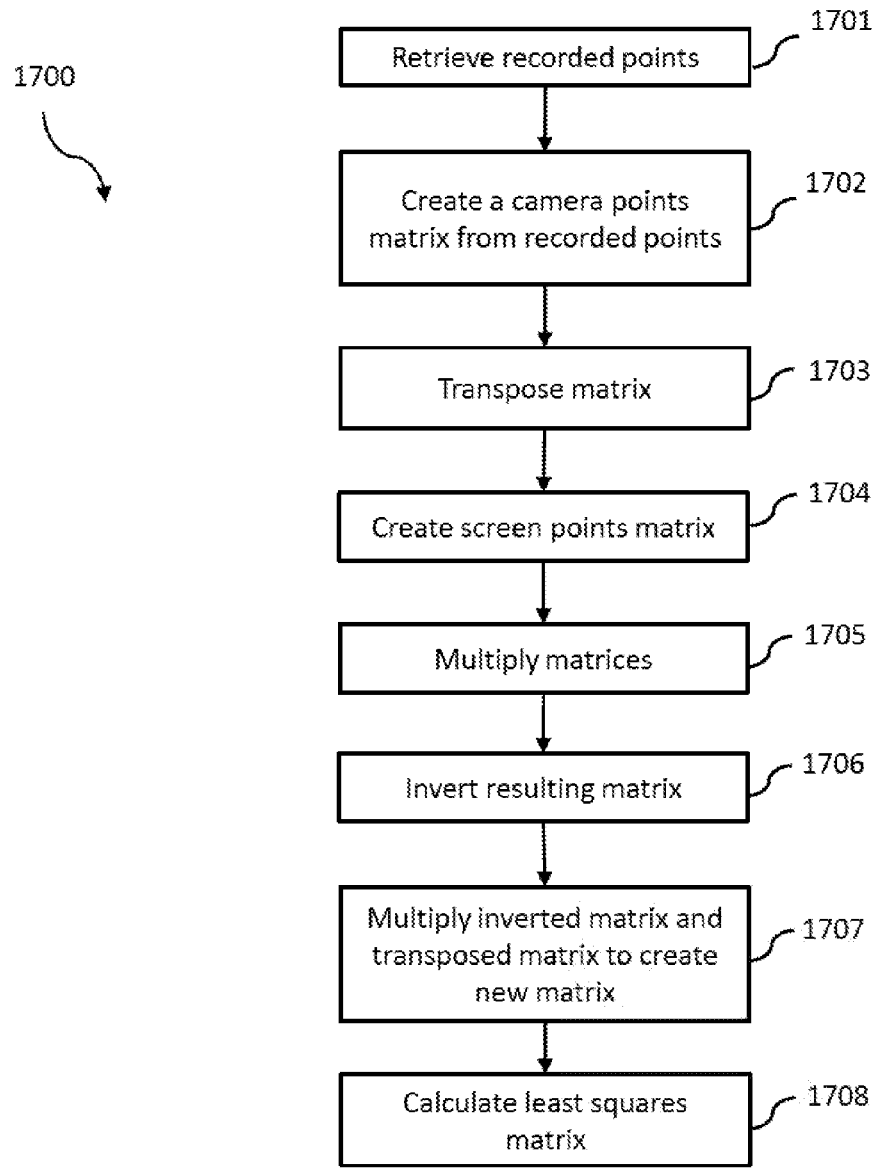
FIG. 17 is a flow chart of a method for converting a set of y positions of a preferred embodiment.

Referring to FIG. 17, step 1602 will be further described as method 1700 for determining a set of y coordinates for each of a set of positions. At step 1701, a set of recorded points is retrieved from memory. At step 1702, a camera points matrix is created from the set of recorded points. In a preferred embodiment, the camera points matrix is defined as $$M_c = \begin{bmatrix} x_{ctl} & y_{ctl} & 1 \\ x_{cbl} & y_{cbl} & 1 \\ x_{cbr} & y_{cbr} & 1 \\ x_{ctr} & y_{ctr} & 1 \end{bmatrix} \quad \text{Eq. 9}$$

where $M_C$ is the camera points matrix, $x_{ctl}, y_{ctl}, 1$ is the x, y, z position of a top left corner of a camera view, $x_{cbl}, y_{cbl}, 1$ is the x, y, z position of a bottom left corner of the camera view, $x_{cbr}, y_{cbr}, 1$ is the x, y, z position of a bottom right corner of the camera view, and $x_{ctr}, y_{ctr}, 1$ is the x, y, z position of a top right corner of the camera view. A 1 is added as a z coordinate for each corner point of the same plane.

At step 1703, the camera points matrix, $M_c$, is transposed. The transposed camera points matrix, $M_{ct}$, is defined as $$M_{ct} = \begin{bmatrix} x_{ctl} & x_{cbl} & x_{cbr} & x_{ctr} \\ y_{ctl} & y_{cbl} & y_{cbr} & y_{ctr} \\ 1 & 1 & 1 & 1 \end{bmatrix}. \quad \text{Eq. 10}$$

At step 1704, a screen points matrix, $M_s$, is created. The screen points matrix is defined as $$M_s = \begin{bmatrix} x_{stl} & y_{stl} \\ x_{sbl} & y_{sbl} \\ x_{sbr} & y_{sbr} \\ x_{str} & y_{str} \end{bmatrix} \quad \text{Eq. 11}$$

where $M_s$ is the screen points matrix, $x_{stl}, y_{stl}$ is the x, y position of a top left corner of a display screen, $x_{sbl}, y_{sbl}$ is the x, y position of a bottom left corner of the display screen, $x_{sbr}, y_{sbr}$ is the x, y position of a bottom right corner of the display screen, and $x_{str}, y_{str}$ is the x, y position of a top right corner of the display screen.

At step 1705, the transposed camera points matrix, $M_{ct}$, is multiplied by the camera points matrix, $M_c$.

$$M_{ct}M_c = \begin{bmatrix} x_{ctl} & x_{cbl} & x_{cbr} & x_{ctr} \\ y_{ctl} & y_{cbl} & y_{cbr} & y_{ctr} \\ 1 & 1 & 1 & 1 \end{bmatrix} \begin{bmatrix} x_{ctl} & y_{ctl} & 1 \\ x_{cbl} & y_{cbl} & 1 \\ x_{cbr} & y_{cbr} & 1 \\ x_{ctr} & y_{ctr} & 1 \end{bmatrix} = \quad \text{Eq. 12}$$

$$\begin{bmatrix} a = x_{ctl}^2 + x_{cbl}^2 + & b = x_{ctl}y_{ctl} + x_{cbl}y_{cbl} + & c = x_{ctl} + x_{cbl} + \\ x_{cbr}^2 + x_{ctr}^2 & x_{cbr}y_{cbr} + x_{ctr}y_{ctr} & x_{cbr} + x_{ctr} \\ d = y_{ctl}x_{ctl} + y_{cbl}x_{cbl} + & e = y_{ctl}^2 + y_{cbl}^2 + & f = y_{ctl} + y_{cbl} + \\ y_{cbr}x_{cbr} + y_{ctr}x_{ctr} & y_{cbr}^2 + y_{ctr}^2 & y_{cbr} + y_{ctr} \\ g = 1 & h = 1 & i = 1 \end{bmatrix}$$

At step 1706, the resulting matrix $M_{ct}M_c$ is inverted, $(M_{ct}M_c)^{-1}$ $$(M_{ct}M_c)^{-1} = \begin{bmatrix} a & b & c \\ d & e & f \\ g & h & i \end{bmatrix}^{-1} = \quad \text{Eq. 13}$$

$$\frac{1}{\det(M_{ct}M_c)} \begin{bmatrix} (ei-fh) & -(bi-ch) & (bf-ce) \\ -(di-fg) & (ai-cg) & -(af-cd) \\ (dh-eg) & -(ah-bg) & (ae-bd) \end{bmatrix}$$

where $\det(M_{ct}M_c)$ is computed by Sarrus' Rule, $$(M_{ct}M_c)^{-1} = \begin{bmatrix} A & D & G \\ B & E & H \\ C & F & I \end{bmatrix}. \quad \text{Eq. 14}$$

Any method for calculating a determinant known in the art may be employed.

At step 1707, a new camera points matrix, $M_{nc}$, is calculated by multiplying the inverted matrix, $(M_{ct}M_c)^{-1}$, by the transposed matrix, $M_{ct}$, from step 1703.

$$M_{nc} = (M_{ct}M_c)^{-1}M_{ct} = \begin{bmatrix} A & D & G \\ B & E & H \\ C & F & I \end{bmatrix} \begin{bmatrix} x_{ctl} & x_{cbl} & x_{cbr} & x_{ctr} \\ y_{ctl} & y_{cbl} & y_{cbr} & y_{ctr} \\ 1 & 1 & 1 & 1 \end{bmatrix} = \quad \text{Eq. 15}$$

$$\begin{bmatrix} \alpha = Ax_{ctl} + & \beta = Ax_{cbl} + & \gamma = Ax_{cbr} + & \delta = Ax_{ctr} + \\ Dy_{ctl} + G & Dy_{cbl} + G & Dy_{cbr} + G & Dy_{ctr} + G \\ \varepsilon = Bx_{ctl} + & \lambda = Bx_{cbl} + & \mu = Bx_{cbr} + & \rho = Bx_{ctr} + \\ Ey_{ctl} + H & Ey_{cbl} + H & Ey_{cbr} + H & Ey_{ctr} + H \\ \sigma = Cx_{ctl} + & \varphi = Cx_{cbl} + & \psi = Cx_{cbr} + & \omega = Cx_{ctr} + \\ Fy_{ctl} + I & Fy_{cbl} + I & Fy_{cbr} + I & Fy_{ctr} + I \end{bmatrix}.$$

At step 1708, a least squares matrix, $M_{ls}$, is calculated by multiplying the new camera points matrix by the screen points matrix created in step 1704.

$$M_{ls} = M_{nc}M_S = \begin{bmatrix} \alpha & \beta & \gamma & \delta \\ \varepsilon & \lambda & \mu & \rho \\ \sigma & \varphi & \psi & \omega \end{bmatrix} \begin{bmatrix} x_{stl} & y_{stl} \\ x_{sbl} & y_{sbl} \\ x_{sbr} & y_{sbr} \\ x_{str} & y_{str} \end{bmatrix} = \quad \text{Eq. 16}$$

$$\begin{bmatrix} l_{s_1} = \alpha x_{stl} + \beta x_{sbl} + & l_{s_2} = \alpha y_{stl} + \beta y_{sbl} + \\ \gamma x_{sbr} + \delta x_{str} & \gamma y_{sbr} + \delta y_{str} \\ l_{s_3} = \varepsilon x_{stl} + \lambda x_{sbl} + & l_{s_4} = \varepsilon y_{stl} + \lambda y_{sbl} + \\ \mu x_{sbr} + \rho x_{str} & \mu y_{sbr} + \rho y_{str} \\ l_{s_5} = \sigma x_{stl} + \varphi x_{sbl} + & l_{s_6} = \sigma y_{stl} + \varphi y_{sbl} + \\ \psi x_{sbr} + \omega x_{str} & \psi y_{sbr} + \omega y_{str} \end{bmatrix}.$$

Figure 18A:
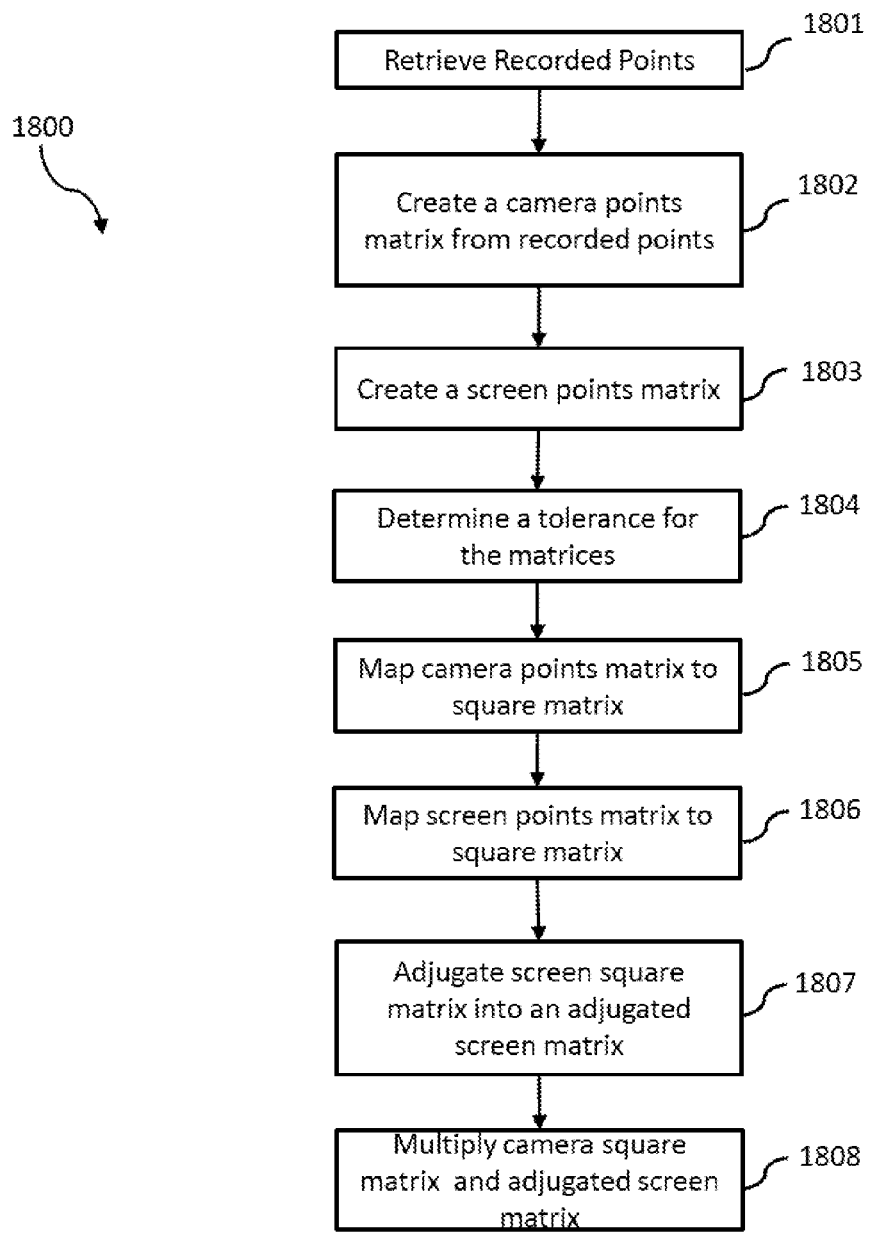
FIG. 18A is a flowchart of a method for converting a set of x positions of a preferred embodiment.

Referring to FIG. 18A, step 1603 will be further described for determining a set of x coordinates for each of a set of positions as method 1800. At step 1801, the set of recorded points is retrieved from memory. At step 1802, a camera points matrix is created from the set of recorded points.

$$M_c = \begin{bmatrix} x_{ctl} & y_{ctl} \\ x_{cbl} & y_{cbl} \\ x_{cbr} & y_{cbr} \\ x_{ctr} & y_{ctr} \end{bmatrix} \quad \text{Eq. 17}$$

where $M_C$ is the camera points matrix, $x_{ctl}, y_{ctl}$ is the x, y position of a top left corner of a camera view, $x_{cbl}, y_{cbl}$ is the x, y position of a bottom left corner of the camera view, $x_{cbr}, y_{cbr}$ is the x, y position of a bottom right corner of the camera view, and $X_{ctr}, Y_{ctr}$ is the x, y position of a top right corner of the camera view.

At step 1803, a screen points matrix is created.

$$M_s = \begin{bmatrix} x_{stl} & y_{stl} \\ x_{sbl} & y_{sbl} \\ x_{sbr} & y_{sbr} \\ x_{str} & y_{str} \end{bmatrix} \quad \text{Eq. 18}$$

where $M_s$ is the screen points matrix, $x_{stl}$, $y_{stl}$ is the x, y position of a top left corner of a display screen, $x_{sbl}$, $y_{sbl}$ is the x, y position of a bottom left corner of the display screen, $x_{sbr}$, $y_{sbr}$ is the x, y position of a bottom right corner of the display screen, and $x_{str}$, $y_{str}$ is the x, y position of a top right corner of the display screen.

At step 1804, a tolerance for each matrix is determined. In a preferred embodiment, the tolerance is a standard deviation of the difference between the number of pixels of the camera and the number of pixels of the screen. Any tolerance or error computation or analysis known in the art may be employed. At step 1805, the camera points matrix is mapped to a camera square matrix, $M_{c_s}$.

$$M_{c_s} = \begin{bmatrix} c_{s1} & c_{s2} & c_{s3} \\ c_{s4} & c_{s5} & c_{s6} \\ c_{s7} & c_{s8} & c_{s9} \end{bmatrix} \quad \text{Eq. 19}$$

At step 1806, the screen points matrix is mapped to a screen square matrix, $M_{s_s}$.

$$M_{s_s} = \begin{bmatrix} s_{s1} & s_{s2} & s_{s3} \\ s_{s4} & s_{s5} & s_{s6} \\ s_{s7} & s_{s8} & s_{s9} \end{bmatrix} \quad \text{Eq. 20}$$

Steps 1805 and 1806 will be further described below with reference to FIG. 18B.

At step 1807, the screen square matrix from step 1806 is adjugated to create an adjugated screen matrix.

$$M_{a_s} = \begin{bmatrix} a_{s1} = s_{s5} \cdot s_{s6} - & a_{s2} = s_{s8} \cdot s_{s9} - & a_{s3} = s_{s2} \cdot s_{s3} - \\ s_{s8} \cdot s_{s9} & s_{s2} \cdot s_{s3} & s_{s5} \cdot s_{s6} \\ a_{s4} = s_{s6} \cdot s_{s4} - & a_{s5} = s_{s9} \cdot s_{s7} - & a_{s6} = s_{s3} \cdot s_{s1} - \\ s_{s9} \cdot s_{s7} & s_{s3} \cdot s_{s1} & s_{s6} \cdot s_{s4} \\ a_{s7} = s_{s4} \cdot s_{s5} - & a_{s8} = s_{s7} \cdot s_{s8} - & a_{s9} = s_{s1} \cdot s_{s2} - \\ s_{s7} \cdot s_{s8} & s_{s1} \cdot s_{s2} & s_{s4} \cdot s_{s5} \end{bmatrix} \quad \text{Eq. 21}$$

At step 1808, the camera square matrix, $M_{c_s}$, and the adjugated screen matrix, $M_{a_s}$, are multiplied into a multiplied matrix, $M_m$.

$$M_m = M_{c_s} \cdot M_{a_s} = \begin{bmatrix} c_{s1} & c_{s2} & c_{s3} \\ c_{s4} & c_{s5} & c_{s6} \\ c_{s7} & c_{s8} & c_{s9} \end{bmatrix} \cdot \begin{bmatrix} a_{s1} & a_{s2} & a_{s3} \\ a_{s4} & a_{s5} & a_{s6} \\ a_{s7} & a_{s8} & a_{s9} \end{bmatrix} \quad M_m = \quad \text{Eq. 22}$$

$$\begin{bmatrix} m_1 = c_{s1} \cdot & m_2 = c_{s1} \cdot & m_3 = c_{s1} \cdot \\ a_{s1} + c_{s2} \cdot & a_{s2} + c_{s2} \cdot & a_{s3} + c_{s2} \cdot \\ a_{s4} + c_{s3} \cdot a_{s7} & a_{s5} + c_{s3} \cdot a_{s8} & a_{s6} + c_{s3} \cdot a_{s9} \\ m_4 = c_{s4} \cdot & m_5 = c_{s4} \cdot & m_6 = c_{s4} \cdot \\ a_{s1} + c_{s5} \cdot & a_{s2} + c_{s5} \cdot & a_{s3} + c_{s5} \cdot \\ a_{s4} + c_{s6} \cdot a_{s7} & a_{s5} + c_{s6} \cdot a_{s8} & a_{s6} + c_{s6} \cdot a_{s9} \\ m_7 = c_{s7} \cdot & m_8 = c_{s7} \cdot & m_9 = c_{s7} \cdot \\ a_{s1} + c_{s8} \cdot & a_{s2} + c_{s8} \cdot & a_{s3} + c_{s8} \cdot \\ a_{s4} + c_{s9} \cdot a_{s7} & a_{s5} + c_{s9} \cdot a_{s8} & a_{s6} + c_{s9} \cdot a_{s9} \end{bmatrix}$$

Figure 18B:
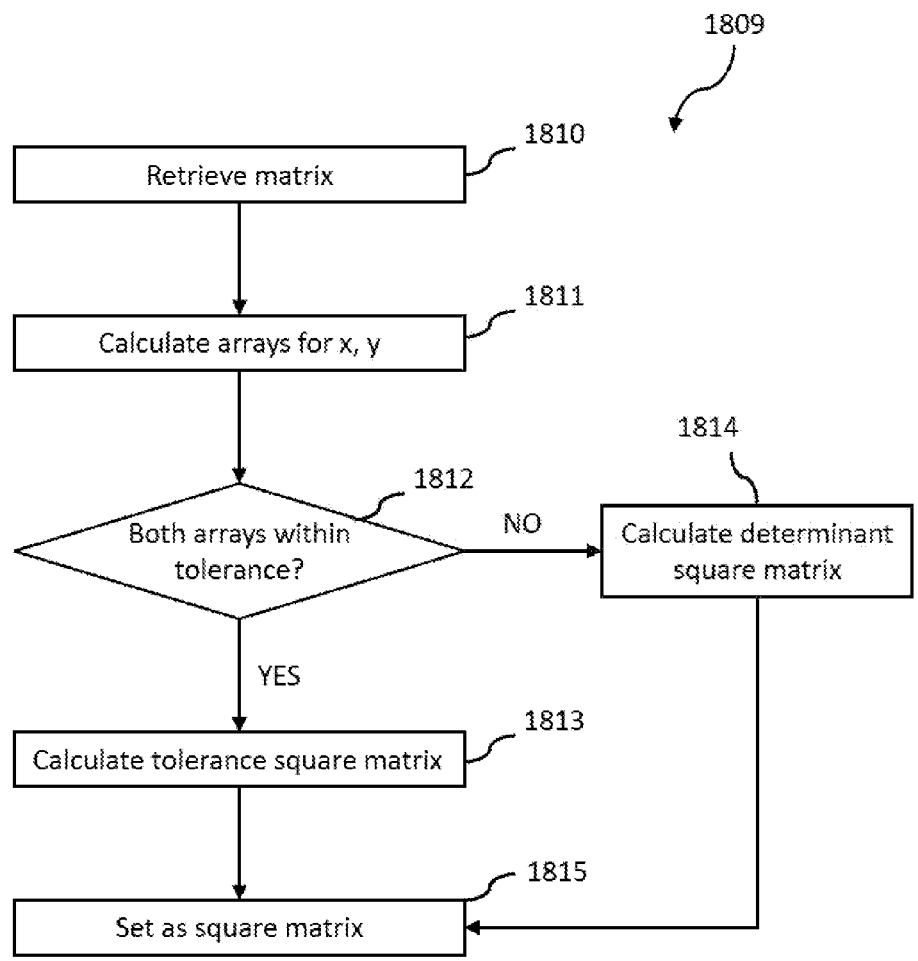
FIG. 18B is a flowchart of a method for mapping a matrix to a square matrix of a preferred embodiment.

Referring to FIG. 18B, each of steps 1805 and 1806 are performed using method 1809, which will now be described. At step 1810, a matrix, $M_i$, is retrieved.

$$M_i = \begin{bmatrix} x_{itl} & y_{itl} \\ x_{ibl} & y_{ibl} \\ x_{ibr} & y_{ibr} \\ x_{itr} & y_{itr} \end{bmatrix} \quad \text{Eq. 23}$$

For step 1805, the matrix $M_i$ is the camera points matrix $M_c$. For step 1806, the matrix $M_i$ is the screen points matrix $M_s$.

At step 1811, a set of arrays, px and py, are created from matrix $M_i$ for x and y coordinates.

$$px = x_{itl} - x_{ibl} + x_{ibr} - x_{itr} \quad \text{Eq. 24}$$

$$py = y_{itl} - y_{ibl} + y_{ibr} - y_{itr} \quad \text{Eq. 25}$$

At step 1812, each array is compared to the tolerance. If both arrays are within the tolerance, then method 1809 proceeds to step 1813. Both arrays are within the tolerance if all the following relationships are true:

$$px < t \quad \text{Rel. 1}$$

$$px > -t \quad \text{Rel. 2}$$

$$py < t \quad \text{Rel. 3}$$

$$py > -t \quad \text{Rel. 4}$$

where t is the tolerance.

At step 1813, a tolerance square matrix, $M_{s_t}$, is calculated from the matrix $M_i$.

$$M_{s_t} = \begin{bmatrix} x_{ibl} - x_{itl} & x_{ibr} - x_{ibl} & x_{itl} \\ y_{ibl} - y_{itl} & y_{ibr} - y_{ibl} & y_{itl} \\ 0 & 0 & 1 \end{bmatrix} \quad \text{Eq. 26}$$

At step 1815, the tolerance square matrix is saved.

If both arrays are not within the tolerance, then method 1809 proceeds to step 1814. At step 1814, a determinant square matrix, $M_{s_d}$ is calculated. In this step, a set of determinant arrays are calculated from the matrix $M_i$.

$$d_{x_1} = x_{ibl} - x_{ibr} \quad \text{Eq. 27}$$

$$d_{x_2} = x_{itr} - x_{ibr} \quad \text{Eq. 28}$$

$$d_{y_1} = y_{ibl} - y_{ibr} \quad \text{Eq. 29}$$

$$d_{y_2} = y_{itr} - y_{ibr} \quad \text{Eq. 30}$$

The determinant of the set of arrays is calculated by $$\text{del} = \det(d_{x_1} \cdot d_{x_2} - d_{y_1} \cdot d_{y_2}). \quad \text{Eq. 31}$$

The determinant square matrix, $M_{s_d}$, is then calculated from the set of determinant arrays, matrix $M_i$, and the determinant of the set of arrays as defined by $$M_{s_d} = \begin{bmatrix} x_{ibl} - x_{itl} + & x_{itr} - x_{itl} + & x_{itl} \\ x_{ibl}\left(\dfrac{\det(px, d_{x2}, py, d_{y2})}{del}\right) & x_{itr}\left(\dfrac{\det(d_{x1}, px, d_{y1}, py)}{del}\right) & \\ y_{ibl} - y_{itl} + & y_{itr} - y_{itl} + & y_{itl} \\ y_{ibl}\left(\dfrac{\det(px, d_{x2}, py, d_{y2})}{del}\right) & y_{itr}\left(\dfrac{\det(d_{x1}, px, d_{y1}, py)}{del}\right) & \\ \dfrac{\det(px, d_{x2}, py, d_{y2})}{del} & \dfrac{\det(d_{x1}, px, d_{y1}, py)}{del} & 1 \end{bmatrix} \quad \text{Eq. 32}$$

At step 1815, the determinant square matrix is saved.

Figure 19:
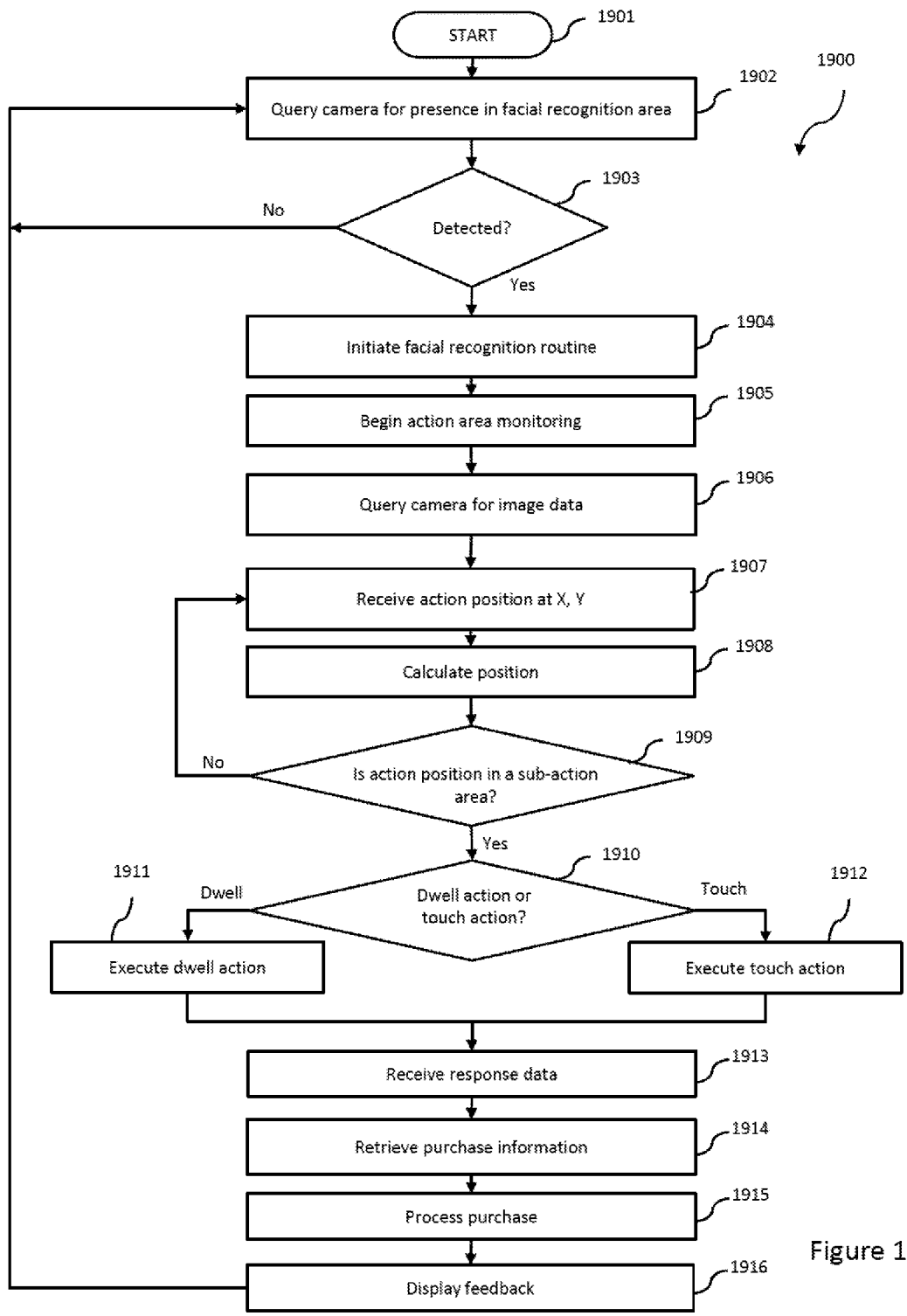
FIG. 19 is a flow chart of a method for interaction with a virtual touch screen of a preferred embodiment.

Referring to FIG. 19, method 1900 for interacting with an action area is described. The method begins at step 1901. At step 1902, the camera is queried for motion presence in facial recognition area. At step 1903, if no presence is detected, the processor returns to step 1902. If a presence is detected, the process moves to step 1904 and initiates the facial recognition routine to determine the identity of the user. In a preferred embodiment, the facial recognition routine sorts through the database to identify facial features which match a predetermined pattern. The database then is queried for associated user information, such as the user's name, account status, and contact information including an email address and phone number, which is stored in the memory for later use by the processor.

At step 1905, the system begins monitoring the action area. At step 1906, the camera is queried for image data within the action area. At step 1907, image data and distance data are perceived in the action area and returned from the camera as coordinates X. Y. At step 1908, an actual position is calculated to translate the perceived position in the perceived coordinates into the coordinates of a screen using method 1600. In a preferred embodiment, the actual position is calculated using method 1600 at a rate of 30 times per second.

At step 1909, if the action position is not in a sub-action area then the process returns to step 1907. If it is in a sub-action area, then the processor proceeds to step 1910. At step 1910, the system determines if the action is a dwell action or a touch action. In a preferred embodiment, the system determines a time for the action position. For example, how long a user's hand is in the sub-action area. The system then compares the time with a predetermined time. In one embodiment, the predetermined time is 1.2 seconds. If the time is less than 1.2 seconds, then the action is a touch action. If the time is greater than or equal to 1.2 seconds, then the action is a dwell action. Other times may be employed.

At step 1911, a dwell look-up table is queried for a predetermined instruction, if an action is within a sub-action action area and time period. For example, the dwell action is purchase request for the product displayed in the sub-action area. The system queries the database and retrieves the product information of the product associated with the sub-action area. The purchase request is sent to the display and via email or text message to the user device as a hyperlink. The email address and phone number is retrieved from the user's profile during the facial recognition process.

At step 1912, a touch look-up table is queried for a predetermined instruction, if an action is within a sub-action area and time period. For example, the touch action is a coupon or other advertisement for the product displayed in the sub-action area. The system queries the database and retrieves the product information of the product associated with the sub-action area. A link to purchase the product is included.

At step 1913, a set of response data is received in the form of a selected link from the purchase request and purchase information entered by a user including name, address, and credit card information. At step 1914 in one embodiment, the purchase information is retrieved from a third party server. At step 1915, the purchase is processed and a receipt is emailed or sent via text message to the user device. At step 1916, a feedback message is displayed on the display. For example, the feedback message states, "Thank you for your purchase."

It will be appreciated by those skilled in the art that the disclosed embodiments provide a system which embodies significantly more than an abstract idea including technical advancements in the field of data processing and a transformation of data which is directly related to real world objects and situations. Specifically, the disclosed system and methods increase the efficiency of a computer network by identifying a target audience for advertisements without collecting and parsing consumer information. Further, the disclosed system and methods increases the speed of processing purchases by eliminating the wait time in order to complete the purchases.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

The invention claimed is:

1. A system comprising:
   a computer connected to a network;
   wherein a third party is connected to the network;
   wherein a user device connected to the network;
   a feedback display connected to the computer;
   a camera connected to the computer;
   a mirror adjacent to the camera;
   a transparent barrier to prevent contact with the computer, the camera, the mirror, and the feedback display;
   the computer programmed to the store and execute instructions that cause the computer to perform a method comprising the steps of:
   receiving an image and distance to target information from the camera;
   defining an action area adjacent to the camera;
   defining a set of sub-action areas for the action area;
   receiving a perceived position in the action area;
   calculating an actual position from the perceived position;
   determining a sub-action position from the actual position;
   executing a set of actions based on the sub-action position and a predetermined time;
   receiving a set of purchase information in response to the set of actions;
   providing visual confirmation with the feedback display that the set of actions were recognized and interpreted by the system;
   processing a purchase and sending a receipt to the user device based on the set of actions;
   wherein the camera gathers image data comprising the image based on a reflected field of view and a blocked field of view;

wherein a first portion of the image based on the blocked field of view:
is based on a first coordinate system reference, and
includes facial characteristics of the user;
wherein a second portion of the image based on the reflected field of view:
comprises the reflected image based on light reflected from the mirror,
is based on a second coordinate system reference comprising an axis that is different from an axis of the first coordinate system, and
includes a hand image;
wherein the second coordinate system reference comprises two axes that are reversed from two axes of the first coordinate system reference; and,
wherein the computer, the camera, the mirror, and the feedback display are disposed on a first side of the transparent barrier and the action area is disposed on a second side of the transparent barrier that is opposite from the first side.

2. The system of claim 1, further comprising the step of retrieving the set of purchase information from the third party.

3. The system of claim 1, further comprising the step of displaying a feedback message in response to the set of purchase information.

4. The system of claim 1, further comprising the steps of:
detecting a human presence adjacent to the action area; and,
identifying a face from the human presence.

5. The system of claim 1, wherein the step of calculating an actual position from the perceived position further comprises the step of calculating a y position for the actual position.

6. The system of claim 5, wherein the step of calculating a y position for the actual position further comprises the steps of:
creating a first camera points matrix from the perceived position;
calculating a transposed matrix from the camera points matrix;
creating a screen points matrix;
calculating a resultant matrix from the screen points matrix and the transposed matrix;
calculating an inverted matrix from the resultant matrix;
calculating a second camera points matrix from the inverted matrix and the transposed matrix; and,
calculating a least squares matrix from the second camera points matrix.

7. The system of claim 6, further comprising the step of calculating the y position from the perceived position and the least squares matrix.

8. The system of claim 1, wherein the step of calculating an actual position from the perceived position further comprises the step of calculating an x position for the actual position.

9. The system of claim 8, wherein the step of calculating an x position for the actual position further comprises the steps of:
creating a camera points matrix from the perceived position;
creating a screen points matrix;
determining a tolerance between the camera points matrix and the screen points matrix;
mapping the camera points matrix to a square camera matrix using the tolerance;
mapping the screen points matrix to a square screen matrix using the tolerance;
calculating an adjugated screen matrix from the square screen matrix; and,
calculating a multiplied matrix from the square camera matrix and the adjugated screen matrix.

10. The system of claim 9, further comprising the step of calculating the x position from the perceived position and the multiplied matrix.

11. The system of claim 1, wherein the camera further comprises a field of view and a boundary defining the field of view, and wherein the step of defining an action area further comprises the steps of:
centering a pointer adjacent the camera;
moving the pointer to the boundary of the field of view for each of a set of corners;
recording a recorded corner position for each of the set of corners; and,
calculating an actual corner position from the recorded corner position for each of the set of corners.

12. A system for purchasing a set of products, the system comprising:
a network;
a computer connected to the network;
a user device connected to the network;
a feedback display connected to the computer;
a camera connected to the computer;
a mirror adjacent to the camera;
a transparent barrier to prevent contact with the computer, the camera, the mirror, and the feedback display;
wherein an action area further comprising a set of sub-action areas, is generated by the computer and is adjacent to the mirror;
wherein a position is detected by the camera;
wherein a message is generated by the computer for the set of products based on the position and a predetermined time;
the computer programmed to the store and execute instructions that cause the computer to perform a method comprising the steps of:
receiving an image and distance to target information from the camera;
providing visual confirmation with the feedback display that the set of actions were recognized and interpreted by the system;
processing a purchase and sending a receipt to the user device based on the set of actions;
wherein the camera gathers image data comprising the image based on a reflected field of view and a blocked field of view;
wherein a first portion of the image based on the blocked field of view:
is based on a first coordinate system reference, and
includes facial characteristics of the user;
wherein a second portion of the image based on the reflected field of view:
comprises a reflected image based on light reflected from the mirror,
is based on a second coordinate system reference comprising an axis that is different from an axis of the first coordinate system, and
includes a hand image;
wherein the second coordinate system reference comprises two axes that are reversed from two axes of the first coordinate system reference; and,
wherein the computer, the camera, the mirror, and the feedback display are disposed on a first side of the transparent barrier and the action area is disposed on a second side of the transparent barrier that is opposite from the first side.

13. The system of claim 12, further comprising a facial recognition area defined by the camera and adjacent to the action area.

14. The system of claim 12, wherein the set of products is associated with a sub-action area of the set of sub-action areas.

15. The system of claim 12, wherein the message is an advertisement for the set of products.

16. The system of claim 12, wherein the message is a purchase request.

17. The system of claim 16, further comprising:
a third party connected to the network; and,
a set of purchase information generated by the third party in response to the purchase request.

18. A system comprising:
a computer connected to a network;
wherein a third party is connected to the network;
wherein a user device connected to the network;
a feedback display connected to the computer;
a camera connected to the computer;
a mirror adjacent to the camera;
a transparent barrier to prevent contact with the computer, the camera, the mirror, and the feedback display;
the computer programmed to the store and execute instructions that cause the system to perform a method comprising the steps of:
receiving an image and distance to target information from the camera;
defining an action area adjacent to the camera;
defining a set of sub-action areas for the action area;
receiving a perceived position in the action area;
calculating a multiplied matrix from the perceived position;
calculating an x position from the perceived position and the multiplied matrix;
calculating a least squares matrix from the perceived position;
calculating a y position from the perceived position and the least squares matrix;
determining a sub-action position from the x position and the y position;
executing a set of actions based on the sub-action position and a predetermined time;
receiving a set of purchase information in response to the set of actions;
providing visual confirmation with the feedback display that the set of actions were recognized and interpreted by the system;
processing a purchase and sending a receipt to the user device based on the set of actions;
wherein the camera gathers image data comprising the image based on a reflected field of view and a blocked field of view;
wherein a first portion of the image based on the blocked field of view:
is based on a first coordinate system reference, and
includes facial characteristics of the user;
wherein a second portion of the image based on the reflected field of view:
comprises the reflected image based on light reflected from the mirror,
is based on a second coordinate system reference comprising an axis that is different from an axis of the first coordinate system, and
includes a hand image;
wherein the second coordinate system reference comprises two axes that are reversed from two axes of the first coordinate system reference; and,
wherein the computer, the camera, the mirror, and the feedback display are disposed on a first side of the transparent barrier and the action area is disposed on a second side of the transparent barrier that is opposite from the first side.

19. The system of claim 18, wherein the step of executing a set of actions based on the sub-action position and a predetermined time further comprises the steps of:
determining a sub-action time for the sub-action position;
comparing the sub-action time to the predetermined time;
retrieving a set of product information based on the sub-action position;
generating an advertisement for the set of product information if the sub-action time is less than the predetermined time; and,
generating a purchase request for the set of product information if the sub-action time is at least the predetermined time.

* * * * *